US008118670B2

(12) United States Patent
Griswold et al.

(10) Patent No.: US 8,118,670 B2
(45) Date of Patent: Feb. 21, 2012

(54) METHOD AND APPARATUS FOR USING A LIGHT VALVE TO REDUCE THE VISIBILITY OF AN OBJECT WITHIN A GAMING APPARATUS

(75) Inventors: Chauncey W. Griswold, Reno, NV (US); Harold E. Mattice, Gardnerville, NV (US); Richard L. Wilder, Sparks, NV (US)

(73) Assignee: IGT, Reno, NV (US)

( * ) Notice: Subject to any disclaimer, the term of this patent is extended or adjusted under 35 U.S.C. 154(b) by 452 days.

(21) Appl. No.: 11/938,086

(22) Filed: Nov. 9, 2007

(65) Prior Publication Data

US 2008/0064497 A1 Mar. 13, 2008

Related U.S. Application Data

(63) Continuation of application No. 10/755,657, filed on Jan. 12, 2004, now Pat. No. 7,309,284.

(51) Int. Cl.

| | |
|---|---|
| ***G06F 17/00*** | (2006.01) |
| ***G06F 19/00*** | (2011.01) |
| ***A63F 9/24*** | (2006.01) |
| ***A63F 13/00*** | (2006.01) |

(52) U.S. Cl. ................ 463/29; 463/16; 463/20; 463/30; 463/31

(58) Field of Classification Search .......... 463/1, 16–20, 463/25, 29–31

See application file for complete search history.

(56) References Cited

U.S. PATENT DOCUMENTS

| | | | |
|---|---|---|---|
| 3,708,219 | A | 1/1973 | Forlini et al. |
| 4,333,715 | A | 6/1982 | Brooks |
| 4,517,558 | A | 5/1985 | Davids |
| 4,574,391 | A | 3/1986 | Morishima |
| 4,578,710 | A | 3/1986 | Hasegawa |
| 4,607,844 | A | 8/1986 | Fullerton |
| 4,621,814 | A | 11/1986 | Stephen et al. |
| 4,659,182 | A | 4/1987 | Aizawa |
| 4,718,672 | A | 1/1988 | Okada |
| 4,911,449 | A | 3/1990 | Dickinson et al. |
| 4,912,548 | A | 3/1990 | Shanker et al. |
| 5,086,354 | A | 2/1992 | Bass et al. |

(Continued)

FOREIGN PATENT DOCUMENTS

| | | |
|---|---|---|
| AU | 721968 | 7/2000 |

(Continued)

OTHER PUBLICATIONS

Living in a flat world? Advertisement written by Deep Video Imaging Ltd., published 2000.

(Continued)

*Primary Examiner* — Milap Shah

(74) *Attorney, Agent, or Firm* — Weaver Austin Villeneuve & Sampson LLP

(57) ABSTRACT

A gaming apparatus is disclosed that includes a housing, a value input device, a transparent panel having an outer surface and an inner surface, and a plurality of mechanically rotatable slot reels disposed in the housing so that the mechanically rotatable reels are visible to a player through the transparent panel. The gaming apparatus also having a light valve that includes a suspended particle device disposed between the inner surface and the slot reels, and a controller coupled to the light valve to cause the light valve to become opaque to substantially block the view of the slot reels to the player.

13 Claims, 18 Drawing Sheets

U.S. PATENT DOCUMENTS 5,113,272 A 5/1992 Reamey
5,132,839 A 7/1992 Travis
5,152,529 A 10/1992 Okada
5,319,491 A 6/1994 Selbrede
5,342,047 A 8/1994 Heidel et al.
5,364,100 A 11/1994 Ludlow et al.
5,375,830 A 12/1994 Takemoto et al.
5,376,587 A 12/1994 Buchmann et al.
5,393,057 A 2/1995 Marnell
5,393,061 A 2/1995 Manship et al.
5,395,111 A 3/1995 Inoue
5,467,893 A 11/1995 Landis, II et al.
5,539,547 A 7/1996 Ishii et al.
5,580,055 A 12/1996 Hagiwara
5,585,821 A 12/1996 Ishikura et al.
5,589,980 A 12/1996 Bass et al.
5,647,798 A 7/1997 Faiciglia
5,725,428 A 3/1998 Achmueller
5,745,197 A 4/1998 Leung et al.
5,752,881 A 5/1998 Inoue
5,762,552 A 6/1998 Vuong et al.
5,764,317 A 6/1998 Sadnovik et al.
5,785,315 A 7/1998 Eiteneer et al.
5,833,537 A 11/1998 Barrie
5,851,148 A 12/1998 Brune et al.
5,910,046 A 6/1999 Wada et al.
5,923,307 A 7/1999 Hogle, IV
5,951,397 A 9/1999 Dickinson
5,956,180 A 9/1999 Bass et al.
5,967,893 A 10/1999 Lawrence et al.
5,971,271 A 10/1999 Wynn et al.
5,988,638 A 11/1999 Rodesch et al.
5,993,027 A 11/1999 Yamamoto et al.
6,001,016 A 12/1999 Walker et al.
6,015,346 A 1/2000 Bennett
6,027,115 A 2/2000 Griswold et al.
6,050,895 A 4/2000 Luciano et al.
6,054,969 A 4/2000 Haisma
6,057,814 A 5/2000 Kalt
6,059,289 A 5/2000 Vancura
6,059,658 A 5/2000 Mangano et al.
6,068,552 A 5/2000 Walker
6,086,066 A 7/2000 Takeuchi
6,086,380 A 7/2000 Chu et al.
6,093,102 A 7/2000 Bennett
6,110,043 A 8/2000 Olsen
6,135,884 A 10/2000 Hedrick et al.
6,159,095 A 12/2000 Frohm et al.
6,159,098 A 12/2000 Slomiany et al.
6,164,645 A 12/2000 Weiss
6,168,520 B1 1/2001 Baerlocher et al.
6,190,255 B1 2/2001 Thomas et al.
6,213,875 B1 4/2001 Suzuki
6,227,971 B1 5/2001 Weiss
6,234,897 B1 5/2001 Frohm et al.
6,244,596 B1 6/2001 Kondratjuk
6,251,013 B1 6/2001 Bennett
6,251,014 B1 6/2001 Stockdale et al.
6,252,707 B1 6/2001 Kleinberger et al.
6,254,481 B1 7/2001 Jaffe
6,261,178 B1 7/2001 Bennett
6,270,411 B1 8/2001 Gura et al.
6,297,785 B1 10/2001 Sommer et al.
6,315,666 B1 11/2001 Mastera et al.
6,322,445 B1 11/2001 Miller
6,337,513 B1 1/2002 Clevenger et al.
6,347,996 B1 2/2002 Gilmore et al.
6,368,216 B1 4/2002 Hedrick et al.
6,379,244 B1 4/2002 Sagawa et al.
6,398,220 B1 6/2002 Inoue
6,416,827 B1 7/2002 Chakrapani et al.
6,444,496 B1 9/2002 Edwards et al.
6,445,185 B1 9/2002 Damadian et al.
6,491,583 B1 12/2002 Gauselmann
6,503,147 B1 1/2003 Stockdale et al.
6,511,375 B1 1/2003 Kaminkow
6,512,559 B1 1/2003 Hashimoto et al.
6,514,141 B1 2/2003 Kaminkow et al.
6,517,433 B2 2/2003 Loose et al.
6,517,437 B1 2/2003 Wells et al.
6,520,856 B1 2/2003 Walker et al.
6,532,146 B1 3/2003 Duquette
6,547,664 B2 4/2003 Saunders
6,575,541 B1 6/2003 Hedrick et al.
6,585,591 B1 7/2003 Baerlocher et al.
6,612,927 B1 9/2003 Slomiany
6,623,006 B2 9/2003 Weiss
D480,961 S 10/2003 Deadman
6,643,124 B1 11/2003 Wilk
6,644,664 B2 11/2003 Muir et al.
6,646,695 B1 11/2003 Gauselmann
6,652,378 B2 11/2003 Cannon et al.
6,659,864 B2 12/2003 McGahn et al.
6,661,425 B1 12/2003 Hiroaki
6,695,696 B1 2/2004 Kaminkow
6,695,703 B1 2/2004 McGahn
6,702,675 B2 3/2004 Poole et al.
6,712,694 B1 3/2004 Nordman
6,715,756 B2 4/2004 Inoue
6,717,728 B2 4/2004 Putilin
6,722,979 B2 4/2004 Gilmore et al.
6,782,281 B1 8/2004 Nagasawa et al.
7,505,049 B2 9/2004 Engel
6,802,777 B2 10/2004 Seelig et al.
6,817,945 B2 11/2004 Seelig
6,817,946 B2 11/2004 Motegi et al.
6,859,219 B1 2/2005 Sall
6,887,157 B2 5/2005 LeMay et al.
6,890,259 B2 5/2005 Breckner et al.
6,906,762 B1 6/2005 Witehira et al.
6,908,381 B2 6/2005 Ellis
6,937,298 B2 8/2005 Okada
6,981,635 B1 1/2006 Hughs-Baird et al.
7,040,987 B2 5/2006 Walker et al.
7,056,215 B1 6/2006 Olive
7,095,180 B2 8/2006 Emslie et al.
7,097,560 B2 8/2006 Okada
7,108,603 B2 9/2006 Olive
7,115,033 B1 * 10/2006 Timperley ........................ 463/20
7,128,647 B2 10/2006 Muir
7,159,865 B2 1/2007 Okada
7,160,187 B2 1/2007 Loose et al.
7,166,029 B2 1/2007 Enzminger
7,204,753 B2 * 4/2007 Ozaki et al. ..................... 463/16
7,207,883 B2 4/2007 Nozaki et al.
7,220,181 B2 5/2007 Okada
7,227,510 B2 6/2007 Mayer, III et al.
7,237,202 B2 6/2007 Gage
7,252,288 B2 8/2007 Seelig et al.
7,252,591 B2 8/2007 Van Asdale
7,255,643 B2 8/2007 Ozaki et al.
7,274,413 B1 9/2007 Sullivan et al.
7,309,284 B2 12/2007 Griswold et al.
7,322,884 B2 1/2008 Emori et al.
7,324,094 B2 1/2008 Moilanen et al.
7,329,181 B2 2/2008 Hoshino et al.
7,352,424 B2 4/2008 Searle
7,439,683 B2 10/2008 Emslie
7,473,173 B2 1/2009 Peterson et al.
7,488,252 B2 2/2009 Griswold et al.
7,510,475 B2 3/2009 Loose et al.
7,558,057 B1 7/2009 Naksen et al.
7,559,837 B1 7/2009 Yoseloff et al.
7,619,585 B2 11/2009 Bell et al.
7,624,339 B1 11/2009 Engel et al.
7,626,594 B1 12/2009 Witehira et al.
7,724,208 B1 5/2010 Engel
7,730,413 B1 6/2010 Engel
7,742,124 B2 6/2010 Bell
7,742,239 B2 6/2010 Bell
7,841,944 B2 * 11/2010 Wells .............................. 463/37
7,951,001 B2 5/2011 Wells
2001/0013681 A1 8/2001 Bruzzese et al.
2001/0016513 A1 8/2001 Muir et al.
2001/0031658 A1 10/2001 Ozaki et al.
2002/0022518 A1 2/2002 Okuda et al.
2002/0045472 A1 4/2002 Adams 2002/0086725 A1 7/2002 Fasbender et al.
2002/0151360 A1 10/2002 Durham et al.
2002/0167637 A1 11/2002 Burke
2002/0173354 A1 11/2002 Winans et al.
2002/0175466 A1* 11/2002 Loose et al. .............. 273/143 R
2002/0183105 A1 12/2002 Cannon
2002/0183109 A1 12/2002 McGahn et al.
2003/0026171 A1 2/2003 Brewer et al.
2003/0027624 A1 2/2003 Gilmore et al.
2003/0032478 A1 2/2003 Takahama et al.
2003/0032479 A1 2/2003 LeMay et al.
2003/0060271 A1 3/2003 Gilmore et al.
2003/0064781 A1 4/2003 Muir
2003/0069060 A1 4/2003 Seelig et al.
2003/0069063 A1 4/2003 Bilyeu et al.
2003/0087690 A1 5/2003 Loose et al.
2003/0128427 A1 7/2003 Kalmanash
2003/0130026 A1* 7/2003 Breckner et al. ................ 463/20
2003/0130028 A1 7/2003 Aida
2003/0148804 A1 8/2003 Ikeya et al.
2003/0153385 A1 8/2003 Ikeya et al.
2003/0157980 A1 8/2003 Loose et al.
2003/0176214 A1 9/2003 Burak et al.
2003/0199295 A1 10/2003 Vancura
2003/0220134 A1 11/2003 Walker et al.
2003/0234489 A1 12/2003 Okada
2003/0236114 A1 12/2003 Griswold et al.
2003/0236118 A1 12/2003 Okada
2004/0009803 A1 1/2004 Bennett et al.
2004/0023714 A1 2/2004 Asdale
2004/0029636 A1* 2/2004 Wells .............................. 463/32
2004/0063490 A1 4/2004 Okada
2004/0066475 A1 4/2004 Searle
2004/0077401 A1 4/2004 Schlottmann et al.
2004/0102244 A1 5/2004 Kryuchkov et al.
2004/0102245 A1 5/2004 Escalera et al.
2004/0116178 A1* 6/2004 Okada ............................. 463/20
2004/0142748 A1 7/2004 Loose et al.
2004/0147303 A1 7/2004 Imura et al.
2004/0150162 A1 8/2004 Okada
2004/0162146 A1 8/2004 Ooto
2004/0166925 A1 8/2004 Emori et al.
2004/0166927 A1* 8/2004 Okada ............................. 463/20
2004/0171423 A1* 9/2004 Silva et al. ...................... 463/31
2004/0183251 A1 9/2004 Inoue
2004/0183972 A1 9/2004 Bell
2004/0192430 A1 9/2004 Burak et al.
2004/0198485 A1 10/2004 Loose et al.
2004/0207154 A1 10/2004 Okada
2004/0209666 A1 10/2004 Tashiro
2004/0209667 A1 10/2004 Emori et al.
2004/0209668 A1 10/2004 Okada
2004/0209671 A1 10/2004 Okada
2004/0209678 A1 10/2004 Okada
2004/0209683 A1 10/2004 Okada
2004/0214635 A1 10/2004 Okada
2004/0214637 A1 10/2004 Nonaka
2004/0219967 A1 11/2004 Giobbi et al.
2004/0224747 A1 11/2004 Okada
2004/0233663 A1 11/2004 Emslie et al.
2004/0235558 A1 11/2004 Beaulieu et al.
2004/0239582 A1 12/2004 Seymour
2004/0266515 A1 12/2004 Gauselmann
2004/0266536 A1 12/2004 Mattice et al.
2005/0020348 A1 1/2005 Thomas et al.
2005/0026673 A1 2/2005 Paulsen et al.
2005/0032571 A1 2/2005 Asonuma
2005/0037843 A1 2/2005 Wells et al.
2005/0049032 A1 3/2005 Kobayashi
2005/0049046 A1 3/2005 Kobayashi
2005/0062410 A1 3/2005 Bell et al.
2005/0063055 A1 3/2005 Engel
2005/0079913 A1 4/2005 Inamura
2005/0085292 A1 4/2005 Inamura
2005/0153772 A1 7/2005 Griswold et al.
2005/0153775 A1* 7/2005 Griswold et al. ............... 463/30
2005/0164786 A1 7/2005 Connelly
2005/0176493 A1 8/2005 Nozaki et al.
2005/0192090 A1* 9/2005 Muir et al. ...................... 463/30
2005/0206582 A1 9/2005 Bell et al.
2005/0208994 A1 9/2005 Berman
2005/0233799 A1 10/2005 LeMay et al.
2005/0239539 A1 10/2005 Inamura
2005/0253775 A1 11/2005 Stewart
2005/0255908 A1 11/2005 Wells et al.
2005/0266912 A1 12/2005 Sekiguchi
2005/0285337 A1 12/2005 Durham et al.
2006/0025199 A1 2/2006 Harkins et al.
2006/0058100 A1 3/2006 Pacey et al.
2006/0063580 A1 3/2006 Nguyen et al.
2006/0073881 A1 4/2006 Pryzby
2006/0100014 A1 5/2006 Griswold et al.
2006/0103951 A1 5/2006 Bell et al.
2006/0111179 A1 5/2006 Inamura
2006/0125745 A1 6/2006 Evanicky
2006/0166727 A1 7/2006 Burak
2006/0191177 A1 8/2006 Engel
2006/0256033 A1 11/2006 Chan et al.
2006/0284574 A1 12/2006 Emslie et al.
2006/0290594 A1 12/2006 Engel et al.
2007/0004510 A1 1/2007 Underdahl et al.
2007/0004513 A1 1/2007 Wells et al.
2007/0010315 A1 1/2007 Hein
2007/0057866 A1 3/2007 Lee et al.
2007/0072665 A1 3/2007 Muir
2007/0077986 A1 4/2007 Loose
2007/0105610 A1 5/2007 Anderson
2007/0105611 A1 5/2007 O'Halloran
2007/0105628 A1 5/2007 Arbogast et al.
2007/0252804 A1 11/2007 Engel
2008/0004104 A1 1/2008 Durham et al.
2008/0007486 A1 1/2008 Fujinawa et al.
2008/0020816 A1 1/2008 Griswold et al.
2008/0020839 A1 1/2008 Wells et al.
2008/0020840 A1 1/2008 Wells et al.
2008/0020841 A1 1/2008 Wells et al.
2008/0068290 A1 3/2008 Muklashy et al.
2008/0096655 A1 4/2008 Rasmussen et al.
2008/0108422 A1 5/2008 Hedrick et al.
2008/0113716 A1 5/2008 Beadell et al.
2008/0113745 A1 5/2008 Williams et al.
2008/0113746 A1 5/2008 Williams et al.
2008/0113747 A1 5/2008 Williams et al.
2008/0113748 A1 5/2008 Williams et al.
2008/0113749 A1 5/2008 Williams et al.
2008/0113756 A1 5/2008 Williams et al.
2008/0113775 A1 5/2008 Williams et al.
2008/0125219 A1 5/2008 Williams et al.
2008/0136741 A1 6/2008 Williams et al.
2008/0261674 A9* 10/2008 Okada ............................. 463/16
2008/0284792 A1 11/2008 Bell
2009/0036208 A1 2/2009 Pennington et al.
2009/0061983 A1 3/2009 Kaufman et al.
2009/0061984 A1 3/2009 Yi et al.
2009/0079667 A1 3/2009 Schlottmann et al.
2009/0082083 A1 3/2009 Wilson et al.
2009/0104989 A1 4/2009 Williams et al.
2009/0111578 A1 4/2009 Griswold et al.
2009/0280888 A1 11/2009 Durham et al.
2009/0312095 A1 12/2009 Durham et al.
2010/0045601 A1 2/2010 Engel et al.
2010/0115391 A1 5/2010 Engel et al.
2010/0115439 A1 5/2010 Engel
2010/0190545 A1 7/2010 Lauzon et al.
2010/0234089 A1 9/2010 Saffari et al.

FOREIGN PATENT DOCUMENTS

AU 2000PQ9586 8/2000
CA 2265283 9/1999
EP 0 454 423 10/1991
EP 0 484 103 5/1992
EP 0 860 807 8/1998
EP 0 919 965 6/1999
EP 0 997 857 10/1999
EP 1000642 A3 5/2000
EP 1 260 928 11/2002
EP 1282088 2/2003
EP 1 391 847 2/2004

| | | | | |
|---|---|---|---|---|
| EP | 1 462 152 | A2 | | 9/2004 |
| EP | 1 492 063 | | | 12/2004 |
| EP | 1 826 739 | | | 8/2007 |
| GB | 1 464 896 | | | 2/1977 |
| GB | 2 120 506 | | | 11/1983 |
| GB | 2 239 547 | | | 7/1991 |
| GB | 2 253 300 | | | 9/1992 |
| GB | 2 316 214 | | | 2/1998 |
| GB | 2385004 | A | | 8/2003 |
| JP | H02-90884 | | | 7/1990 |
| JP | H03-20388 | | | 2/1991 |
| JP | 04-220276 | | | 8/1992 |
| JP | H05-68585 | | | 9/1993 |
| JP | 06-043425 | | | 2/1994 |
| JP | 07-124290 | | | 5/1995 |
| JP | H10-015247 | | | 1/1998 |
| JP | 10234932 | A | | 9/1998 |
| JP | 10234932 | A | * | 9/1998 |
| JP | 11000441 | A | | 1/1999 |
| JP | 11000441 | A | * | 1/1999 |
| JP | H11-137852 | | | 5/1999 |
| JP | 2000-300729 | | | 10/2000 |
| JP | 2000-350805 | | | 12/2000 |
| JP | 2000-354685 | | | 12/2000 |
| JP | 2001-062032 | | | 3/2001 |
| JP | 2001-238995 | | | 9/2001 |
| JP | 2001-252393 | | | 9/2001 |
| JP | 2001-252394 | | | 9/2001 |
| JP | 2002-085624 | | | 3/2002 |
| JP | 2004-089707 | | | 3/2004 |
| JP | 2004-105616 | | | 4/2004 |
| JP | 2004166879 | | | 6/2004 |
| JP | 2005-253561 | | | 9/2005 |
| JP | 2005-266387 | | | 9/2005 |
| JP | 2005-266388 | | | 9/2005 |
| JP | 2005-274906 | | | 10/2005 |
| JP | 2005-274907 | | | 10/2005 |
| JP | 2005-283864 | | | 10/2005 |
| JP | 2006-043425 | | | 2/2006 |
| JP | 2006-059607 | | | 3/2006 |
| JP | 2006-346226 | | | 12/2006 |
| JP | 2007-200869 | | | 8/2007 |
| RU | 2053559 | C1 | | 1/1996 |
| RU | 2145116 | C1 | | 1/2000 |
| RU | 29794 | U1 | | 5/2003 |
| WO | WO 93/13446 | | | 7/1993 |
| WO | WO 99/42889 | | | 8/1999 |
| WO | WO 99/44095 | | | 9/1999 |
| WO | WO 99/53454 | | | 10/1999 |
| WO | WO 00/32286 | | | 6/2000 |
| WO | WO 01/15127 | | | 3/2001 |
| WO | WO 01/15128 | | | 3/2001 |
| WO | WO 01/15132 | | | 3/2001 |
| WO | WO 01/38926 | | | 5/2001 |
| WO | WO 01/09664 | | | 8/2001 |
| WO | WO 02/41046 | | | 5/2002 |
| WO | WO 02/084637 | | | 10/2002 |
| WO | WO 02/086610 | | | 10/2002 |
| WO | WO 02/089102 | | | 11/2002 |
| WO | WO 03/001486 | | | 1/2003 |
| WO | WO 03/023491 | | | 3/2003 |
| WO | WO 03/032058 | | | 4/2003 |
| WO | WO03/039699 | | | 5/2003 |
| WO | WO 03/040820 | | | 5/2003 |
| WO | PCT/NZ03/000153 | | | 7/2003 |
| WO | WO 03/079094 | | | 9/2003 |
| WO | WO 04/001486 | | | 12/2003 |
| WO | WO 2004/001488 | | | 12/2003 |
| WO | WO 2004/002143 | | | 12/2003 |
| WO | WO 2004/008226 | | | 1/2004 |
| WO | WO 2004/023825 | | | 3/2004 |
| WO | WO 2004/025583 | | | 3/2004 |
| WO | WO 2004/036286 | | | 4/2004 |
| WO | WO 2004/079674 | | | 9/2004 |
| WO | WO 2004/102520 | | | 11/2004 |
| WO | WO2004/102520 | | | 11/2004 |
| WO | WO 2005/071629 | | | 1/2005 |
| WO | WO 2005/071632 | | | 8/2005 |
| WO | WO 2006/034192 | | | 3/2006 |
| WO | WO 2006/038819 | | | 4/2006 |
| WO | WO 2006/052327 | | | 5/2006 |
| WO | WO 2006/112740 | | | 10/2006 |
| WO | WO 2007/040413 | | | 4/2007 |
| WO | WO 2008/005278 | | | 1/2008 |
| WO | WO2008/028153 | | | 3/2008 |
| WO | WO 2008/048857 | | | 4/2008 |
| WO | WO 2008/061068 | | | 5/2008 |
| WO | WO 2008/063908 | | | 5/2008 |
| WO | WO 2008/063914 | | | 5/2008 |
| WO | WO 2008/063952 | | | 5/2008 |
| WO | WO 2008/063956 | | | 5/2008 |
| WO | WO 2008/063968 | | | 5/2008 |
| WO | WO 2008/063969 | | | 5/2008 |
| WO | WO 2008/063971 | | | 5/2008 |
| WO | WO 2008/079542 | | | 7/2008 |
| WO | WO 2009/029720 | | | 3/2009 |
| WO | WO 2009/039245 | | | 3/2009 |
| WO | WO 2009/039295 | | | 3/2009 |
| WO | WO 2009/054861 | | | 4/2009 |
| WO | WO 2010/023537 | | | 3/2010 |
| WO | WO 2010/039411 | | | 4/2010 |

OTHER PUBLICATIONS

Written Opinion of the International Searching Authority dated May 25, 2005, for PCT Application No. PCT/US2005/000597.

Bosner, "How Smart Windows Work," HowStuffWorks, Inc.,www.howstuffworks.com, 1998-2004, 9 pages.

International Exam Report dated Sep. 21, 2007 in European Application No. 05 705 315.9.

U.S. Appl. No. 11/849,119, filed Aug. 31, 2007.

U.S. Appl. No. 11/858,695, filed Sep. 20, 2007.

U.S. Appl. No. 11/858,845, filed Sep. 20, 2007.

U.S. Appl. No. 11/858,849, filed Sep. 20, 2007.

U.S. Appl. No. 11/859,127, filed Sep. 21, 2007.

U.S. Appl. No. 11/938,184, filed Nov. 9, 2007.

U.S. Appl. No. 11/938,086, filed Nov. 9, 2007.

U.S. Appl. No. 11/938,151, filed Nov. 9, 2007.

U.S. Appl. No. 11/877,611, filed Oct. 23, 2007.

Office Action dated Aug. 29, 2007 from U.S. Appl. No. 10/755,598.

Office Action dated Oct. 31, 2007 from U.S. Appl. No. 10/213,626.

Final Office Action dated Mar. 28, 2007 from U.S. Appl. No. 10/213,626.

Office Action dated Apr. 27, 2006 from U.S. Appl. No. 10/213,626.

Final Office Action dated Jan. 10, 2006 from U.S. Appl. No. 10/213,626.

Office Action dated Aug. 31, 2004 from U.S. Appl. No. 10/213,626.

European Office Action dated Sep. 13, 2007 in Application No. 05 705 315.9.

"Debut of the Let's Make a Deal Slot Machine," Let's Make a Deal 1999-2002, http:///www.letsmakeadeal.com/pr01.htm. Printed Dec. 3, 2002 (2 pages).

"Light Valve". [online] [retrieved on Nov. 15, 2005]. Retrieved from the Internet URL http://www.meko.co.uk/lightvalve.shtml (1 page).

"Liquid Crystal Display". [online]. [retrieved on Nov. 16, 2005]. Retrieved form the Internet URL http://en.wikipedia.org/wiki/LCD (6 pages).

"What is SPD?" SPD Systems, Inc. 2002, http://www.spd-systems.com/spdq.html. Printed Dec. 4, 2002 (2 pages).

Bosnor, Kevin, "How Smart Windows Will Work," Howstuffworks, Inc. 1998-2002, http://www/howstuffworks.com/smart-window.htm/printable. Printed Nov. 25, 2002 (5 pages).

Novel 3-D Video Display Technology Developed, News release: Aug. 30, 1996, www.eurekalert.org/summaries/1199.html, printed from Internet Archive using date Sep. 2, 2000.

PCT, International Search Report, 5 page document, International Appln. No. PCT/US2005/000950, Dated: Nov. 1, 2005.

PCT, Written Opinion of the International Searching Authority, 7 page document, Applicant's File No. PCT/ISA/220, International Appln. No. PCT/US2005/000950, Dated: Nov. 1, 2005.

Time Multiplexed Optical Shutter (TMOS): A revolutionary Flat Screen Display Technology, www.vea.com/TMOS.html, Apr. 8, 1999, printed from Internet Archive using date Oct. 6, 1999.

Time Multiplexed Optical Shutter (TMOS): A revolutionary Flat Screen Display Technology, www.tralas.com/TMOS.html, Apr. 5, 2001, printed from Internet Archive using date Apr. 11, 2001.
Saxe et al., “Suspended-Particle Devices”, www.refe-spd.com, Apr./May 1996, 5 pages.
“SPD”, Malvino Inc., www.malvino.com, Jul. 19, 1999, 10 pages.
U.S. Appl. No. 09/622,409, filed Nov. 6, 2000, Engel, Gabriel.
U.S. Notice of Allowance dated Sep. 29, 2008 issued in U.S. Appl. No. 10/982,012.
U.S. Office Action dated Nov. 2, 2006 issued in U.S. Appl. No. 10/755,657.
U.S. Office Action dated Apr. 17, 2007 issued in U.S. Appl. No. 10/755,657.
U.S. Notice of Allowance and Notice of Allowability dated Aug. 22, 2007 issued in U.S. Appl. No. 10/755,657.
U.S. Office Action Final dated Apr. 23, 2008 issued in U.S. Appl. No. 10/755,598.
U.S. Office Action dated Oct. 8, 2008 issued in U.S. Appl. No. 10/755,598.
U.S. Office Action Final dated Jul. 1, 2009 issued in U.S. Appl. No. 10/755,598.
U.S. Office Action Final dated Jan. 22, 2010 issued in U.S. Appl. No. 10/755,598.
U.S. Office Action Final dated Aug. 4, 2010 issued in U.S. Appl. No. 10/755,598.
U.S. Office Action dated Oct. 31, 2008 issued in U.S. Appl. No. 11/829,917.
U.S. Office Action Final dated Aug. 11, 2009 issued in U.S. Appl. No. 11/829,917.
U.S. Office Action dated Jan. 29, 2010 issued in U.S. Appl. No. 11/829,917.
U.S. Office Action Final dated Aug. 5, 2010 issued in U.S. Appl. No. 11/829,917.
U.S. Office Action dated Nov. 17, 2004 issued in U.S. Appl. No. 10/376,852.
U.S. Office Action dated Apr. 13, 2005 issued in U.S. Appl. No. 10/376,852.
U.S. Office Action Final dated Nov. 18, 2005 issued in U.S. Appl. No. 10/376,852.
U.S. Advisory Action dated Feb. 7, 2006 issued in U.S. Appl. No. 10/376,852.
U.S. Office Action dated Sep. 19, 2006 issued in U.S. Appl. No. 10/376,852.
U.S. Notice of Informal or Non-Responsive Amendment dated Mar. 9, 2007 issued in U.S. Appl. No. 10/376,852.
U.S. Office Action Final dated Jun. 22, 2007 issued in U.S. Appl. No. 10/376,852.
U.S. Office Action dated Jan. 28, 2008 issued in U.S. Appl. No. 10/376,852.
U.S. Office Action Final dated Aug. 6, 2008 issued in U.S. Appl. No. 10/376,852.
U.S. Office Action dated Feb. 2, 2009 issued in U.S. Appl. No. 10/376,852.
U.S. Notice of Allowance dated Nov. 10, 2009 issued in U.S. Appl. No. 10/376,852.
U.S. Office Action dated Mar. 25, 2010 issued in U.S. Appl. No. 10/376,852.
Australian Examiner’s Report No. 2 dated Jun. 9, 2010 issued in AU 2005207566.
Australian Examiner’s First Report dated Nov. 12, 2009 issued in AU Application No. 2005207309.
Australian Examiner’s First Report dated May 17, 2007 issued in AU 2004216952.
Australian Examiner’s First Report dated Jun. 17, 2009 issued in AU 2005207566.
Australian Examiner’s Report No. 2 dated Jul. 30, 2007 issued in AU 2004216952.
Australian Examiner’s Report No. 3 dated May 28, 2008 issued in AU 2004216952.
Chinese First Office Action for Application No. 2005800022940 dated Nov. 28, 2008.
Chinese First Office Action for Application No. 200580002318.2 dated Sep. 5, 2008.
Chinese Second Office Action for Application No. 2005800022940 dated Sep. 25, 2009.
Chinese Second Office Action for Application No. 200580002318.2 dated Jun. 26, 2009.
Chinese Third Office Action for Application No. 2005800022940 dated May 11, 2010.
Chinese Third Office Action for Application No. 200580002318.2 dated Nov. 6, 2009.
European Examination Report dated Oct. 5, 2009 issued in EP0 7814629.7.
European Examination Report dated Nov. 17, 2006 issued in EP 05 705 552.7.
European Examination Report dated Sep. 4, 2007 issued in EP0579 637.4.
European Extended Search Report and Opinion for dated Apr. 1, 2008 issued in EP08001740.3.
Japanese Description of Office Action Final dated Apr. 10, 2007 issued in Application No. 2005-518567.
Japanese Description of Office Action (interrogation) dated May 25, 2009 issued by an Appeal Board in Application No. 2005-518567.
Japanese Description of Office Action dated Jul. 4, 2006 issued in Application No. 2005-518567.
Mexican Office Action (as described by foreign counsel) dated Jun. 29, 2009 issued in MX07/05381.
PCT International Preliminary Examination Report and Written Opinion dated Mar. 3, 2009 issued in WO2008/028153.
PCT International Preliminary Report on Patentability and Written Opinion dated Jan. 27, 2006 issued in WO2006/052327.
PCT International Search Report dated Jan. 27, 2006 issued in WO 2006/052327.
PCT International Search Report and Written Opionion dated Apr. 9, 2008 issued in WO 2008/028153.
PCT International Search Report dated May 25, 2005 issued in WO 2005/071629.
Russian Resolution on Granting Patent for Invention dated Jul. 18, 2008 issued in.
Bosner, Kevin (2004) “How Smart Windows Work,” *HowStuffWorks, Inc.*, 1998-2004, retrieved from the Internet on Apr. 1, 2004 at http://www.howstuffworks.com/smart-window.htm/printable, 9 pages.
Newton, Harry, Newton’s Telecom Dictionary, Jan. 1998, Telecom Books and Flatiron Publishing, p. 399.
U.S. Appl. No. 12/849,284, dated Aug. 3, 2010, Silva, Gregory A.
U.S. Appl. No. 13/094,259, dated Apr. 26, 2011, Wells, William.
U.S. Office Action dated Oct. 9, 2009 issued in U.S. Appl. No. 11/514,808.
U.S. Office Action Final dated Apr. 22, 2010 issued in U.S. Appl. No. 11/514,808.
U.S. Office Action and Examiner Interview Summary dated Oct. 18, 2010 issued in U.S. Appl. No. 11/514,808.
U.S. Office Action Final dated Apr. 27, 2011 issued in U.S. Appl. No. 11/514,808.
U.S. Office Action dated Dec. 2, 2009 issued in U.S. Appl. No. 11/829,852.
U.S. Office Action dated Jul. 14, 2010 issued in U.S. Appl. No. 11/829,852.
U.S. Office Action dated Nov. 14, 2008 issued in U.S. Appl. No. 11/829,853.
U.S. Office Action dated Oct. 31, 2008 issued in U.S. Appl. No. 11/829,849.
US Notice of Panel Decision from Pre-Appeal Brief Review dated Dec. 1, 2010 issued in U.S. Appl. No. 10/755,598.
US Office Action dated Mar. 28, 2011 issued in U.S. Appl. No. 10/755,598.
U.S. Office Action dated Jun. 23, 2009 issued in U.S. Appl. No. 11/938,151.
U.S. Office Action Final dated Feb. 8, 2010 issued in U.S. Appl. No. 11/938,151.
U.S. Advisory Action dated Apr. 22, 2010 issued in U.S. Appl. No. 11/938,151.
U.S. Office Action dated Jul. 23, 2010 issued in U.S. Appl. No. 11/938,151.
U.S. Office Action Final dated Jan. 4, 2011 issued in U.S. Appl. No. 11/938,151.

U.S. Office Action (Notice of Panel Decision from Pre-Appeal Brief Review) dated Apr. 27, 2011 issued in U.S. Appl. No. 11/938,151.
U.S. Office Action dated Jul. 9, 2010 issued in U.S. Appl. No. 11/858,849.
U.S. Office Action Final dated Nov. 30, 2010 issued in U.S. Appl. No. 11/858,849.
U.S. Office Action dated Mar. 22, 2011 issued in U.S. Appl. No. 11/858,849.
U.S. Office Action dated Jul. 9, 2009 issued in U.S. Appl. No. 11/858,700.
U.S. Office Action Final dated Jan. 4, 2010 issued in U.S. Appl. No. 11/858,700.
U.S. Office Action Final dated Apr. 7, 2010 issued in U.S. Appl. No. 11/858,700.
U.S. Office Action dated Aug. 5, 2010 issued in U.S. Appl. No. 11/858,700.
U.S. Office Action Final dated Dec. 27, 2010 issued in U.S. Appl. No. 11/858,700.
U.S. Office Action dated Jul. 9, 2009 issued in U.S. Appl. No. 11/858,695.
U.S. Office Action Final dated Jan. 4, 2010 issued in U.S. Appl. No. 11/858,695.
U.S. Office Action Final dated Mar. 29, 2010 issued in U.S. Appl. No. 11/858,695.
U.S. Office Action Final dated Jul. 7, 2010 issued in U.S. Appl. No. 11/858,695.
U.S. Office Action dated Apr. 28, 2011 issued in U.S. Appl. No. 11/858,793.
U.S. Office Action dated Jul. 9, 2009 issued in U.S. Appl. No. 11/858,693.
U.S. Office Action Final dated Mar. 23, 2010 issued in U.S. Appl. No. 11/858,693.
U.S. Advisory Action dated Jun. 1, 2010 issued in U.S. Appl. No. 11/858,693.
U.S. Office Action dated Aug. 5, 2010 issued in U.S. Appl. No. 11/858,693.
U.S. Office Action Final dated Feb. 7, 2011 issued in U.S. Appl. No. 11/858,693.
U.S. Interview Summary dated Mar. 29, 2011 issued in U.S. Appl. No. 11/858,693.
U.S. Advisory Action dated Apr. 8, 2011 issued in U.S. Appl. No. 11/858,693.
U.S. Office Action dated Jul. 10, 2009 issued in U.S. Appl. No. 11/858,845.
U.S. Office Action Final dated Feb. 5, 2010 issued in U.S. Appl. No. 11/858,845.
U.S. Notice of Panel Decision from Pre-Appeal Brief Review dated Jun. 8, 2010 issued in U.S. Appl. No. 11/858,845.
U.S. Office Action dated Apr. 7, 2011 issued in U.S. Appl. No. 11/849,119.
U.S. Office Action dated Nov. 12, 2010 issued in U.S. Appl. No. 11/859,127.
U.S. Notice of Allowance dated May 4, 2011 issued in U.S. Appl. No. 11/859,127.
U.S. Office Action dated Jan. 20, 2011 issued in U.S. Appl. No. 11/983,770.
U.S. Office Action Final dated May 16, 2011 issued in U.S. Appl. No. 11/983,770.
U.S. Office Action dated Jun. 13, 2003 issued in U.S. Appl. No. 09/966,851.
U.S. Office Action dated Mar. 30, 2004 issued in U.S. Appl. No. 09/966,851.
U.S. Office Action Final dated Dec. 14, 2004 issued in U.S. Appl. No. 09/966,851.
U.S. Notice of Allowance dated Jun. 13, 2006 issued in U.S. Appl. No. 09/966,851.
U.S. Office Action dated Sep. 9, 2009 issued in U.S. Appl. No. 11/549,258.
U.S. Office Action Final dated Mar. 26, 2010 issued in U.S. Appl. No. 11/549,258.
U.S. Office Action dated Jul. 9, 2010 issued in U.S. Appl. No. 11/549,258.
U.S. Office Action Final dated Dec. 21, 2010 issued in U.S. Appl. No. 11/549,258.
U.S. Office Action dated Sep. 3, 2010 issued in U.S. Appl. No. 11/938,632.
U.S. Office Action Final dated Dec. 15, 2010 issued in U.S. Appl. No. 11/938,632.
U.S. Examiner Interview Summary dated Feb. 9, 2011 issued in U.S. Appl. No. 11/938,632.
U.S. Advisory Action dated Mar. 16, 2011 issued in U.S. Appl. No. 11/938,632.
U.S. Notice of Allowance dated May 27, 2011 issued in U.S. Appl. No. 11/938,632.
U.S. Office Action dated Jun. 23, 2009 issued in U.S. Appl. No. 11/938,184.
U.S. Office Action Final dated Feb. 8, 2010 issued in U.S. Appl. No. 11/938,184.
U.S. Office Action dated Aug. 5, 2010 issued in U.S. Appl. No. 11/938,184.
U.S. Examiner Interview Summary dated Nov. 4, 2010 issued in U.S. Appl. No. 11/938,184.
U.S. Office Action Final dated Jan. 20, 2011 issued in U.S. Appl. No. 11/938,184.
U.S. Advisory Action dated Mar. 25, 2011 issued in U.S. Appl. No. 11/938,184.
U.S. Examiner Interview Summary dated Oct. 28, 2004 issued in U.S. Appl. No. 10/213,626.
U.S. Advisory Action dated Apr. 5, 2006 issued in U.S. Appl. No. 10/213,626.
U.S. Interview Summary dated Jul. 17, 2007 issued in U.S. Appl. No. 10/213,626.
U.S. Office Action Final dated Aug. 29, 2008 issued in U.S. Appl. No. 10/213,626.
U.S. Examiner Interview Summary dated Feb. 26, 2009 issued in U.S. Appl. No. 10/213,626.
U.S. Examiner Interview Summary dated Mar. 13, 2009 issued in U.S. Appl. No. 10/213,626.
U.S. Office Action dated Jul. 9, 2009 issued in U.S. Appl. No. 10/213,626.
U.S. Examiner Interview Summary dated Feb. 4, 2010 issued in U.S. Appl. No. 10/213,626.
U.S. Notice of Allowance and Examiner Interview Summary dated Mar. 1, 2010 issued in U.S. Appl. No. 10/213,626.
U.S. Notice of Allowance dated Oct. 4, 2010 issued in U.S. Appl. No. 10/213,626.
U.S. Office Action dated May 24, 2007 issued in U.S. Appl. No. 11/167,655.
U.S. Examiner Interview Summary dated Jul. 17, 2007 issued in U.S. Appl. No. 11/167,655.
U.S. Office Action dated Jan. 3, 2008 issued in U.S. Appl. No. 11/167,655.
U.S. Office Action Final dated Mar. 8, 2008 issued in U.S. Appl. No. 11/167,655.
U.S. Office Action Final dated Sep. 2, 2008 issued in U.S. Appl. No. 11/167,655.
U.S. Examiner Interview Summary dated Mar. 13, 2009 issued in U.S. Appl. No. 11/167,655.
U.S. Office Action dated Jul. 17, 2009 issued in U.S. Appl. No. 11/167,655.
U.S. Notice of Allowance dated Mar. 11, 2010 issued in U.S. Appl. No. 11/167,655.
U.S. Notice of Allowance dated Jul. 7, 2010 issued in U.S. Appl. No. 11/167,655.
U.S. Notice of Allowance dated Dec. 10, 2010 issued in U.S. Appl. No. 11/167,655.
U.S. Notice of Allowance dated Apr. 1, 2011 issued in U.S. Appl. No. 11/167,655.
PCT International Search Report dated Jun. 6, 2005 issued in WO 2005/071632.
PCT International Preliminary Report on Patentability and Written Opinion dated Jul. 17, 2006 issued in WO 2005/071632.
PCT Written Opinion dated Apr. 9, 2008 issued in WO 2008/028153.
PCT International Search Report dated Dec. 7, 2009 issued in WO 2010/039411.

PCT International Preliminary Report on Patentability and Written Opinion dated Jul. 17, 2006 issued in WO 2005/071629.
Australian Examiner's Report No. 2 dated Sep. 15, 2010 issued in AU Application No. 2005207309.
European Examination Report dated Sep. 13, 2007 issued in EP 05 705 315.9-1238.
Mexican Office Action (as described by foreign attorney) dated Jun. 18, 2009 issued for MX 06/07950.
PCT International Search Report dated May 2, 2008 issued in WO 2008/061068.
PCT Written Opinion dated May 2, 2008 issued in WO 2008/061068.
PCT International Preliminary Report on Patentability and Written Opinion dated May 12, 2009 issued in WO 2008/061068.
EP Examination Report dated Oct. 28, 2009 issued in EP 07 845 059.0 1238.
PCT International Search Report dated May 20, 2008 issued in WO 2008/063952.
PCT International Search Report and Written Opinion dated May 20, 2008 issued in WO 2008/063952.
PCT International Preliminary Report on Patentability and Written Opinion dated May 19, 2009 issued in WO 2008/063952.
European Examination Report dated Oct. 28, 2009 issued in EP 07 864 281.6.
PCT International Search Report dated Dec. 18, 2008 issued in WO 2009/039245.
PCT Written Opinion dated Dec. 18, 2008 issued in WO 2009/039245.
PCT International Preliminary Report on Patentability and Written Opinion dated Mar. 24, 2010 issued in WO 2009/039245.
PCT International Search Report dated May 7, 2008 issued in WO 2008/063914.
PCT Written Opinion dated May 7, 2008 issued in WO 2008/063914.
PCT International Preliminary Examination Report on Patentability and Written Opinion dated May 19, 2009 issued in WO 2008/063914.
European Examination Report dated Oct. 28, 2009 issued in EP 07 844 998.0.
PCT International Search Report dated May 14, 2008 issued in WO 2008/063956.
PCT Written Opinion dated May 14, 2008 issued in WO 2008/063956.
PCT International Preliminary Report on Patentability and Written Opinion dated May 19, 2009 issued in WO 2008/063956.
PCT International Search Report dated May 8, 2008 issued in issued in WO 2008/063908.
PCT Written Opinion dated May 8, 2008 issued in issued in WO 2008/063908.
PCT International Preliminary Report on Patentability and Written Opinion dated May 19, 2009 issued in WO 2008/063908.
PCT International Search Report dated Jun. 11, 2008 issued in WO 2008/079542.
PCT Written Opinion dated Jun. 11, 2008 issued in WO 2008/079542.
PCT International Preliminary Report on Patentability and Written Opinion dated May 19, 2009 issued in WO 2008/079542.
European Examination Report dated Oct. 28, 2009 issued in EP 07 872 343.4.
PCT International Search Report dated May 20, 2008 issued in WO 2008/063971.
PCT Written Opinion dated May 20, 2008 issued in WO 2008/063971.
PCT International Preliminary Report on Patentability and Written Opinion dated May 19, 2009 issued in WO 2008/063971.
European Examination Report dated Oct. 28, 2009 issued in EP 07 845 062.4.
PCT International Search Report dated Dec. 11, 2008 issued in WO 2009/039295.
PCT Written Opinion dated Dec. 11, 2008 issued in WO 2009/039295.
PCT International Preliminary Report on Patentability and Written Opinion dated Mar. 24, 2010 issued in WO 2009/039295.
PCT International Search Report dated Jul. 16, 2008 issued in W02009/054861.
PCT Written Opinion dated Jul. 16, 2008 issued in W02009/054861.
PCT International Preliminary Report on Patentability and Written Opinion dated Apr. 27, 2010 issued in WO 2009/054861.
Australian Examiner's First Report dated Sep. 22, 2005 issued in AU 29246/02.
Australian Notice of Opposition by Aristocrat Technologies dated Apr. 8, 2009 issued in AU 2007200982.
Australian Statement of Grounds and Particulars in Support of Opposition by Aristocrat Technologies dated Jul. 6, 2009 issued in AU 2007200982.
Australian Withdrawal of Opposition by Aristocrat Technologies dated Aug. 12, 2009 issued in AU 2007200982.
PCT International Search Report and Written Opinion dated May 9, 2008 issued in for WO 2008/048857.
PCT Written Opinion dated May 9, 2008 issued in WO 2008/048857.
PCT International Preliminary Report on Patentability and Written Opinion dated Apr. 15, 2009 issued in WO2008/048857.
European Examination Report dated Sep. 10, 2009 issued in EP 07 853 965.7.
PCT International Search Report dated May 20, 2008 issued in WO 2008/063969.
PCT Written Opinion dated May 20, 2008 issued in WO 2008/063969.
PCT International Preliminary Report on Patentability and Written Opinion dated May 19, 2009 issued in WO 2008/063969.
PCT International Search Report dated Jul. 21, 2008 issued in WO 2008/063968.
PCT Written Opinion dated Jul. 21, 2008 issued in WO 2008/063968.
PCT International Preliminary Report on Patentability and Written Opinion dated May 19, 2009 issued in WO 2008/063968.
European Examination Report dated Oct. 28, 2009 issued in EP 07 854 617.3.
PCT International Search Report dated Jun. 15, 2004 issued in WO 2004/07974.
PCT International Preliminary Report on Patentability and Written Opinion dated Sep. 2, 2005 issued in WO 2004/07974.
Australian Examiner's First Report dated Apr. 5, 2005 issued in AU2003227286.
Australian Examination Report (as described by Applicant's Attorney) dated Feb. 26. 2009 issued in AU2003227286.
Australian Re-Examination Report dated May 1, 2009 issued in AU2003227286.
Australian Examiner Communication regarding Claims dated Nov. 24, 2009 issued in AU2003227286.
Australian Notice of Acceptance with Exam Comments dated Jan. 28, 2010 issued in AU2003227286.
Australian Examiner's First Report dated Jul. 23, 2007 issued in AU2006203570.
Australian Notice of Acceptance with Examiner's Comments dated Nov. 15, 2007 issued in AU2006202570.
Australian Re-Examination Report (No. 1) dated Dec. 2, 2009 issued in AU2006203570.
Australian Examiner Communication dated Feb. 5, 2010 issued in AU 2006203570.
Australian Re-Examination Report (No. 2) dated Feb. 8, 2010 issued in AU 2006203570.
"Pointer Ballistics for Windows XP.pdf" (Oct. 31, 2002), Microsoft,[downloaded on Aug. 27, 2010 from http://www.microsoft.com/whdc/archive/pointer-bal.mspx], 3 pages.
Police 911, Wikipedia, Jan. 22, 2002, retrieved from Internet at http://en.wilkipedia.org/widi/Police_911 on Oct. 28, 2007, 4 pgs.

* cited by examiner

METHOD AND APPARATUS FOR USING A LIGHT VALVE TO REDUCE THE VISIBILITY OF AN OBJECT WITHIN A GAMING APPARATUS

CROSS-REFERENCE TO RELATED APPLICATIONS

This application is a continuation of and claims priority under U.S.C. §120 from U.S. patent application Ser. No. 10/755,657, filed Jan. 12, 2004 and entitled, "METHOD AND APPARATUS FOR USING A LIGHT VALVE TO REDUCE THE VISIBILITY OF AN OBJECT WITHIN A GAMING APPARATUS", which issued as U.S. Pat. No. 7,309,284 on Dec. 8, 2007, and which is incorporated by reference herein for all purposes.

BACKGROUND

This patent is directed to a casino gaming apparatus, and more particularly to a gaming apparatus having a plurality of mechanical slot reels and one or more light valves. The gaming apparatus may be either an individual gaming unit or a casino gaming system that has a plurality of gaming units.

Conventional casino gaming units that have included mechanical slot reels sometimes experience situations where the mechanical slot reels stop spinning and display a wrong symbol. This wrong symbol could result in a display of a winning symbol combination that was different from the symbol combination that was correctly determined by the gaming apparatus. Many factors could cause one or more of the mechanical reel to stop on an incorrect symbol, including for example, a power failure, an electrostatic discharge into the housing of the gaming apparatus, a mechanical failure, etc.

Regardless of the cause of the mechanical slot reels stopping on a wrong symbol, the casinos have traditionally been forced to choose between one of several undesirable options, such as paying the player the prize corresponding to the symbol combination incorrectly displayed or refusing to pay the player the prize corresponding to the symbol combination incorrectly displayed. As could be expected, the second option would create a great deal of anger on behalf of the player and generate ill will toward the casino.

SUMMARY OF THE INVENTION

In one aspect, the invention is directed to a slot machine having a housing, a transparent panel associated with the housing, wherein the panel has an outer surface and an inner surface, and a plurality of mechanically rotatable slot reels, wherein the slot reels are disposed in the housing so that the reels are visible to a player of the slot machine through the transparent panel. The slot machine also includes a light valve including a suspended particle device that is disposed between the inner surface of the transparent panel and the slot reels, wherein the suspended particle device is adapted to be coupled to a power source, and is also adapted to become substantially transparent when a first voltage is applied to the suspended particle device and adapted to become substantially opaque when a second voltage is applied to the suspended particle device.

The mechanically rotatable slot reels are visible to the player through the suspended particle device when the first voltage is applied to the suspended particle device, and the suspended particle device substantially blocks visibility of the mechanically rotatable slot reels to the player when the second voltage is applied to the suspended particle device. Also included in the slot machine is a value input device and a controller operatively coupled to the mechanically rotatable slot reels and the value input device, wherein the controller includes a processor and a memory operatively coupled to the processor. The controller is programmed to allow a person to make a wager and to determine a value payout associated with an outcome of a game utilizing the mechanically rotatable slot reels.

In another aspect, the invention is directed to a slot machine as described above, and further having an electronic display unit disposed in the housing between the inner surface of the transparent panel and the slot reels, so that at least a portion of the electronic display unit is visible to the player of the slot machine through the transparent panel and the suspended particle device when the first voltage is applied to the suspended particle device, the electronic display unit being operatively coupled to the controller. The suspended particle device is adapted to also block at least a portion of the visibility of the electronic display unit to the player when the second voltage is applied to the suspended particle device.

In another aspect, the invention is directed to a slot machine as described above, and further having a mechanically moveable member disposed in the housing and located proximate the inner surface of the transparent panel, so that at least a portion of the mechanically moveable member is visible to the player of the slot machine through the transparent panel and the suspended particle device when the first voltage is applied to the suspended particle device. The suspended particle device being adapted to substantially block the visibility of the mechanically moveable member to the player when the second voltage is applied to the suspended particle device.

In another aspect, the invention is directed to a slot machine having a housing, a transparent panel associated with the housing, wherein the transparent panel has an outer surface and an inner surface, a power source, and a plurality of mechanically rotatable slot reels disposed in the housing so that the slot reels are visible to a player of the slot machine through the transparent panel. Also included is a light valve that is disposed between the inner surface of the transparent panel and the slot reels, the light valve operatively coupled to the power source and adapted to become substantially transparent when a first voltage is applied to the light valve and adapted to become substantially opaque when a second voltage is applied to the light valve.

The slot machine also includes a value input device and a controller operatively coupled to the mechanically rotatable slot reels, the light valve, and the value input device, wherein the controller has a processor and a memory operatively coupled to the processor. The controller is programmed to cause the light valve to become substantially transparent so that the mechanically rotatable reels are visible through the light valve to the player, to allow a person to make a wager, and to determine a value payout associated with an outcome of a game utilizing the mechanically rotatable reels.

Additional aspects of the invention are defined by the claims of this patent.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
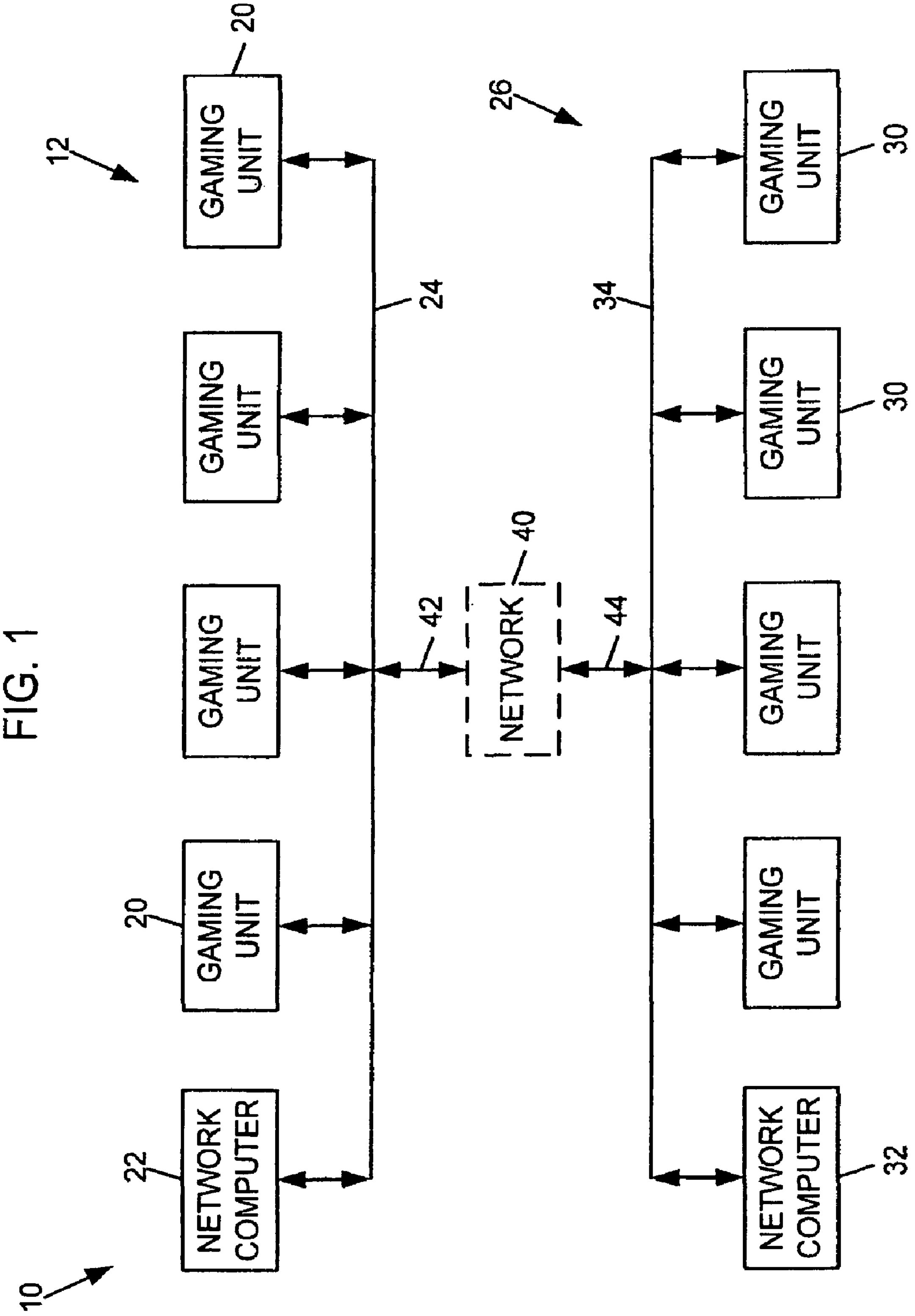
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may be provided as a dedicated hardwired link or a wireless link. Although the data link 24 is shown as a single data link 24, the data link 24 may comprise multiple data links.

Figure 2:
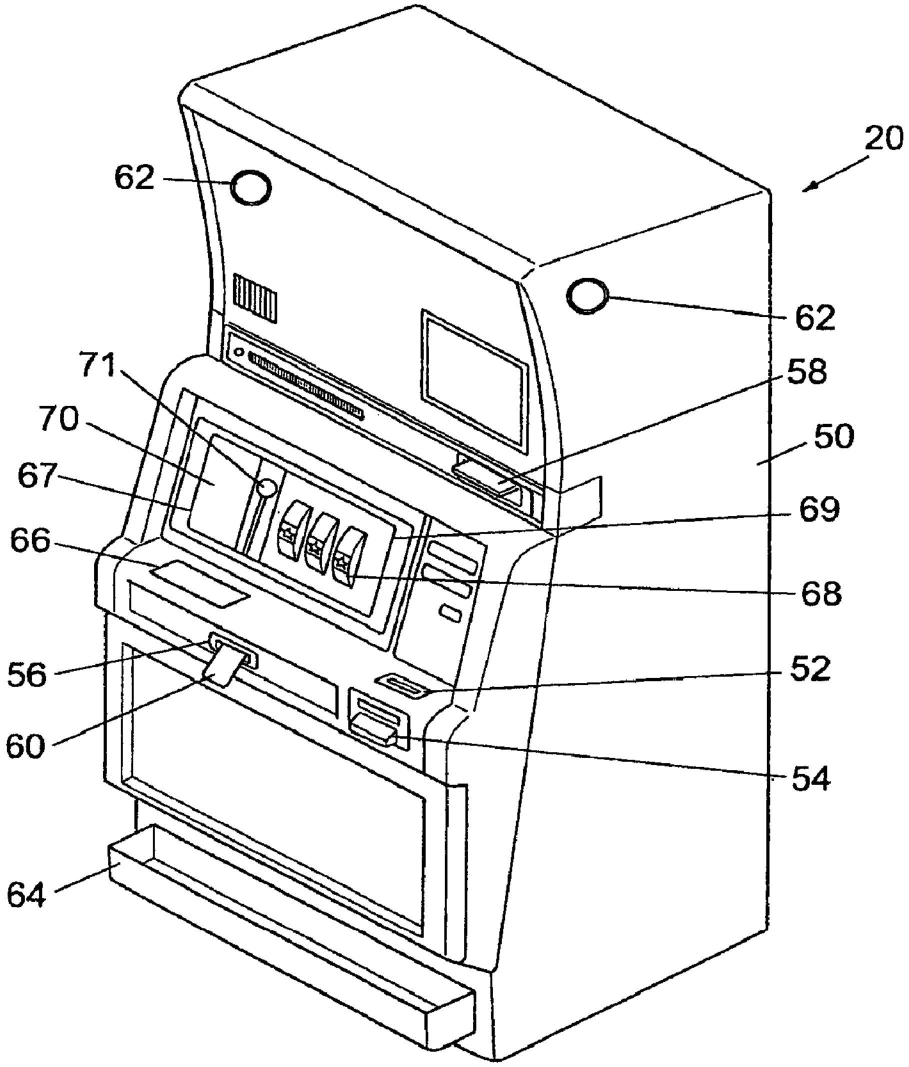
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a electronic display unit 70. Where the gaming unit 20 is designed to facilitate play of a video casino game, such as video poker or video slots, the electronic display unit 70 may be a color video display unit that displays images relating to the particular game or games. Where the gaming unit 20 is designed to facilitate play of a reel-type slot machine, the electronic display unit 70 may comprise a plurality of mechanical reels that are rotatable, with each of the reels having a plurality of reel images disposed thereon. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

The housing 50 may have a transparent panel 67 associated therewith, wherein the transparent panel 67 has an outer surface and inner surface. A plurality of mechanically rotatable slot reels 68 may be disposed within the housing 50 and behind the transparent panel 67. In other words, the slot reels 68 are closer to the inner surface of the panel 67 than the outer surface of the panel 67. The mechanically rotatable slot reels 68 may be positioned within the housing 50 so that a surface of the slot reels 68 and a plurality of different reel symbols disposed thereon are visible to a player through the transparent panel 67. While FIG. 2 illustrates three mechanically rotatable slot reels 68 in the housing 50, it should be noted that any number of mechanically rotatable reels may be used. It should also be noted that the mechanically rotatable slot reels 68 may be part of a primary game played on the gaming apparatus 20 or they may be used as a special bonus game for more standard casino games.

The gaming apparatus 20 may also include a light valve 69 disposed within the housing 50 between the inner surface of the panel 67 and the slot reels 68. The light valve 69 is described in greater detail below, but briefly, is coupled to a power source and is adapted to become substantially transparent when a first voltage is applied to the light valve 69 and adapted to become substantially opaque when a second voltage is applied to the light valve 69. When it is desired, a controller may cause the light valve 69 to become substantially transparent so that the mechanically rotatable slot reels 68 are visible through the light valve 69 to a player at the gaming unit 20.

In addition to the slot reels 68, the gaming apparatus 20 may also include an electron electronic display unit 70 for displaying images relating to the game or games provided by the gaming apparatus 20. The electronic display unit 70 may be disposed on the inside of the housing 50, behind the light valve 69, similar to the slot reels 68. It should be noted that more than one light valve 69 may be used, as well as more than one electronic display units 70 may be used. It should also be noted that the electronic display unit 70 may be located elsewhere on the gaming unit 20 or eliminated completely. Similarly, the mechanical reels 68 may be located elsewhere on the gaming unit 20. For example, the electronic display unit 70 may be enlarged to occupy the portion with the mechanical reels 68 on FIG. 2, and one or more mechanically rotatable members, such as a wheel (not shown) may be mounted on top of the gaming unit for use in a bonus game. Furthermore, if the mechanical wheel is located on top of the gaming unit 20, it may be encased behind a transparent panel and a light valve similar to the transparent panel 67 and the light valve 69.

The gaming unit 20 may also include a mechanically moveable member 71 that is disposed within the housing 50 behind the light valve 69. For example, mechanically moveable members, such as balls, donuts, wheels, etc., may spin in place within the housing 50 and behind the light valve 69 and panel 67. Other mechanically moveable members, such as "falling" tokens, "bouncing" balls, etc., may follow a predefined motion or predetermined path to give the appearance of movement, such as falling or bouncing.

Figure 2A:
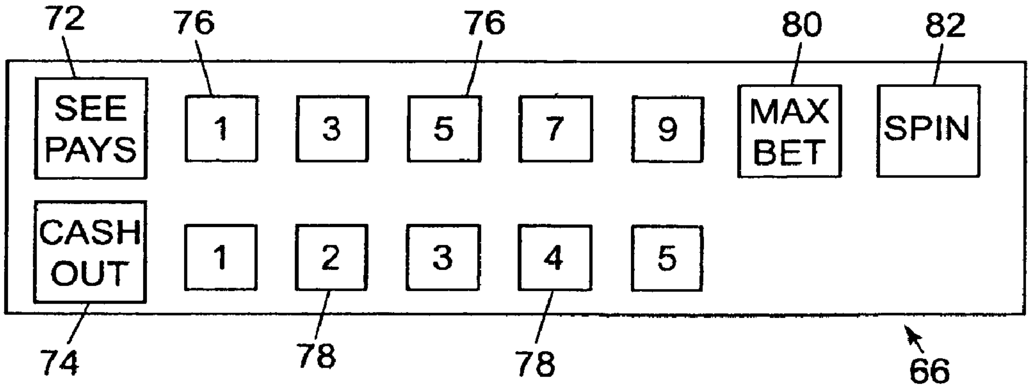
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual"

reels. Referring to FIG. 2A, if the electronic display unit 70 is provided in the form of a video display unit, the control panel 66 may include a "See Pays" button 72 that, when activated, causes the electronic display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. If the electronic display unit 70 is provided as a video display unit, the control panel 66 could be generated by the electronic display unit 70. In that case, each of the buttons of the control panel 66 could be a colored area generated by the electronic display unit 70, and some type of mechanism may be associated with the electronic display unit 70 to detect when each of the buttons was touched, such as a touch-sensitive screen.

Light Valve Configuration

Figure 3:
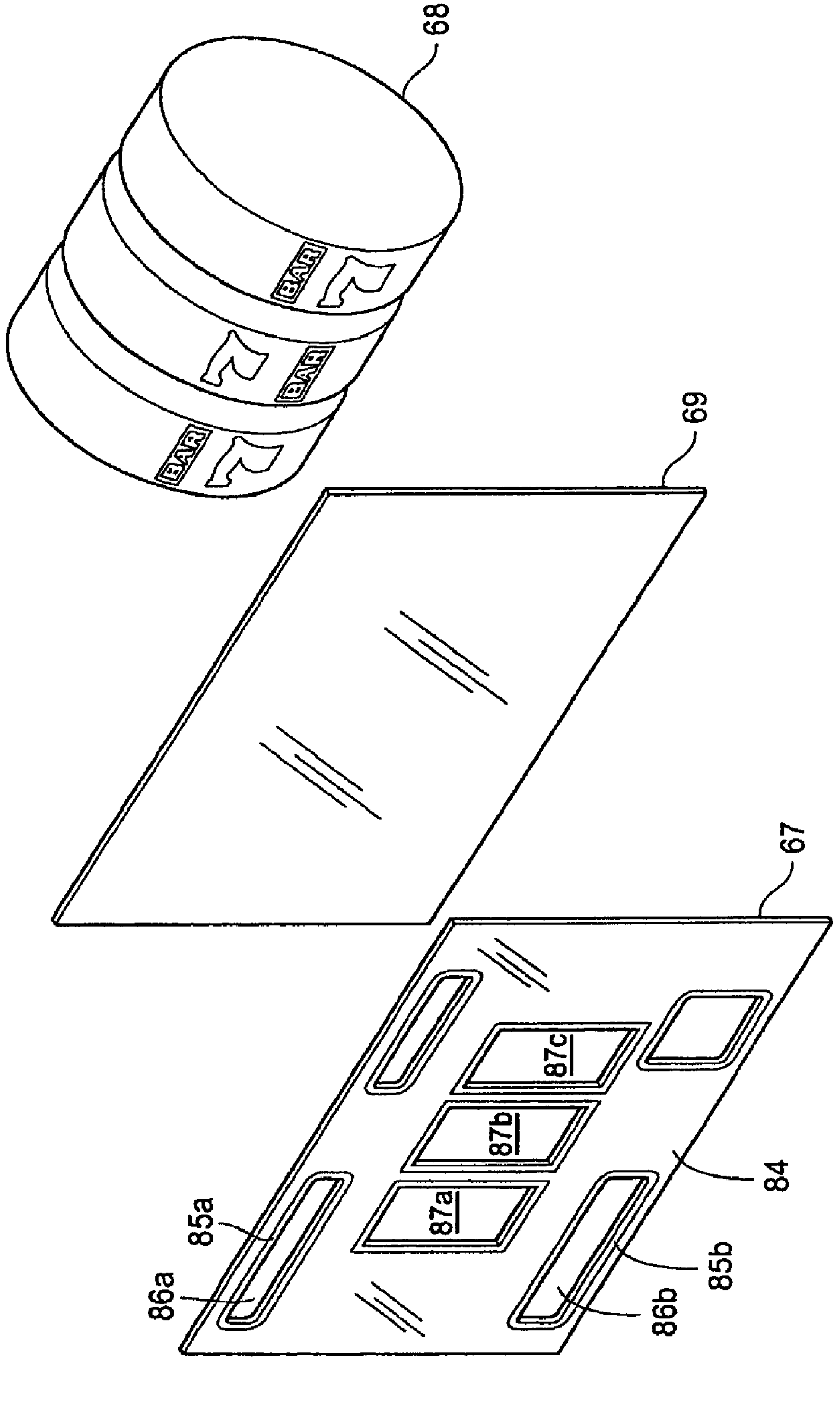
FIG. 3 is an exploded perspective view of an embodiment of a transparent panel, a light valve, and a plurality of mechanically rotatable slot reels.

FIG. 3 is an exploded perspective view of an embodiment of the transparent panel 67, a light valve 69, and a plurality of mechanically rotatable slot reels 68. Referring to FIG. 3, the transparent panel 67 may have a number of non-transparent colored inks applied to the inner surface of the transparent panel 67. As shown in FIG. 3, a first ink 84 is used as a background and a second ink 85*a* and 85*b* are used as borders around a number of transparent openings 86*a* and 86*b* in the transparent panel 67. In addition, the panel 67 may be a touch-sensitive panel for control of the game routine by a player.

Also shown in FIG. 3 are the plurality slot reels 68 that are independently rotatable, with each of the reels 68 having a plurality of reel images disposed thereon. Each mechanical reel 68 may further include a light element (not shown), such as an electroluminescent light element, to illuminate the reel images or other portions of the mechanical reels 68. The mechanical reels 68 may comprise a reel strip manufactured from a translucent material, such as plastic, with a light element disposed behind the reel strip. When activated, the light element illuminates the reel strip from behind, allowing all or part of the mechanical reel to be illuminated. An example of a mechanical reel having a light element is disclosed in U.S. Pat. No. 6,027,115 which is expressly incorporated by reference herein.

While shown in FIG. 2, but not shown here, one or more electronic display units 70 may be disposed behind the panel 67 and the light valve 69 so that the electronic display units line up with and are visible through the light valve 69, as well as the openings 86*a* and 86*b*. The one or more electronic display units may be, for example, a cathode ray tube (CRT) display, a flat panel display (FPD), a front projection display, or a rear projection display. Moreover, additional mechanically moveable members may also be disposed behind the light valve 69, proximate the slot reels 68.

The light valve 69 may be disposed between the transparent display 67 and the slot reels 68. Various devices may be utilized for the light valve 69, including, but not limited to, suspended particle devices (SPD), electrochromic devices, polymer dispersed liquid crystal (PDLC) devices, etc. Generally, the light valve 69 may switch between being transparent, and being opaque (or translucent), depending on whether a current is applied or not. For example, SPDs and PDLC devices become transparent when applied with a first voltage and become opaque or translucent when a second voltage is applied, with the second voltage being very low or approximately zero. On the other hand, electrochromic devices become opaque when applied with a voltage, and transparent when little or no voltage is applied. Additionally, the light valve 69 may attain varying levels of translucency and opaqueness. For example, while a PDLC device is generally either transparent or opaque, suspended particle devices and electrochromic devices allow for varying degrees of transparency, opaqueness or translucency, depending on the applied voltage level.

When the light valve 69 is opaque, or substantially opaque, a player's view of the slot reels 68 may be obscured (or blocked). The light valve 69 may also be translucent and provide varying degrees of visibility of the slot reels 68 through the openings 87*a*, 87*b*, and 87*c*, thereby varying the visibility of the slot reels 68 (e.g., gradually "dimming" or "brightening" the visibility of the slot reels 68). Varying the translucency of the light valve 69 may cause the visibility of the slot reels 68 to range from allowing the player to view and recognize the images on the slot reels 68 to merely allowing light and color through without being able to distinguish the images.

Gaming Unit Electronics

Figure 4:
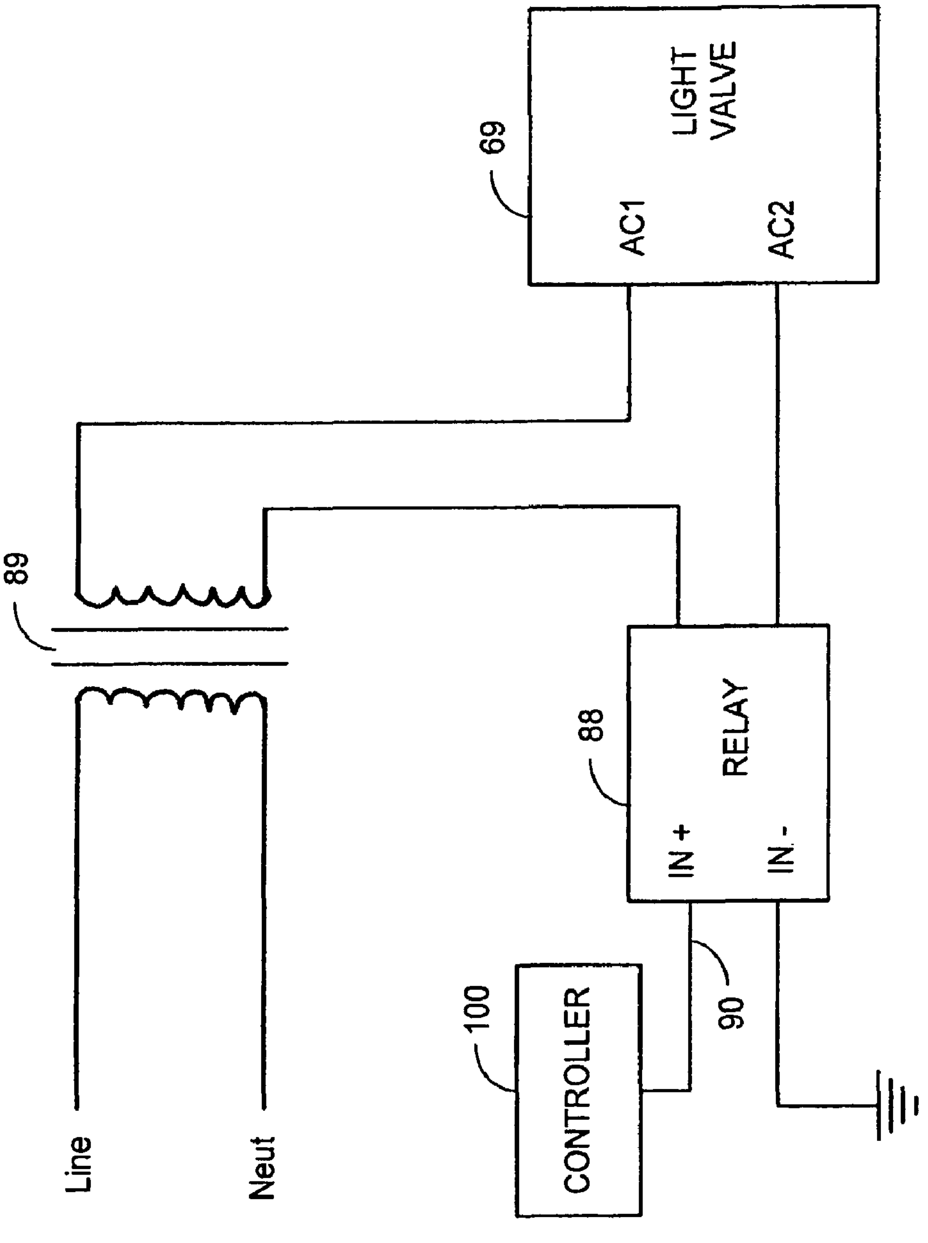
FIG. 4 is an exemplary schematic diagram of a light valve.

FIG. 4 is an exemplary schematic diagram of the light valve 69. The light valve 69 is controlled with the use of a controller

100 that is coupled to a solid state relay device 88. The controller 100 causes the relay device 88 to turn on and off as needed by the gaming apparatus 20. In doing so, the AC voltage is turned on and off the light valve 69. A transformer 89 is used to isolate a 120 VAC input voltage from the light valve 69 and to change the potential from 120 VAC to about 50 VAC. The controller 100 causes the relay device 88 to turn on and off. A high level sent from the controller 100 on line 90 turns on the relay device 88, causing the light valve 69 to become substantially transparent. A low level sent from the controller 100 on line 90 turns off the relay device 88, causing the light valve 69 to become opaque. The relay device 88 may be solid state optronic SP646 and the light valve 69 may be a SPD, model APD-Gray that is manufactured by InspecTech Aeroservice, Inc. from Ft. Lauderdale, Fla.

It should be noted that while the light valve 69 shown in FIG. 4 is operatively coupled to the controller 100, the light valve 69 may be coupled directly to a power source so that the function of the light valve 69 is based solely on the presence of power applied to the light valve 69. In other words, whenever the gaming unit 20 has power, the light valve 69 could be made transparent. But when power to the light valve 69 is interrupted, the light valve 69 would become opaque and block the view of any components disposed within the housing 50 that are behind the light valve 69.

Figure 5:
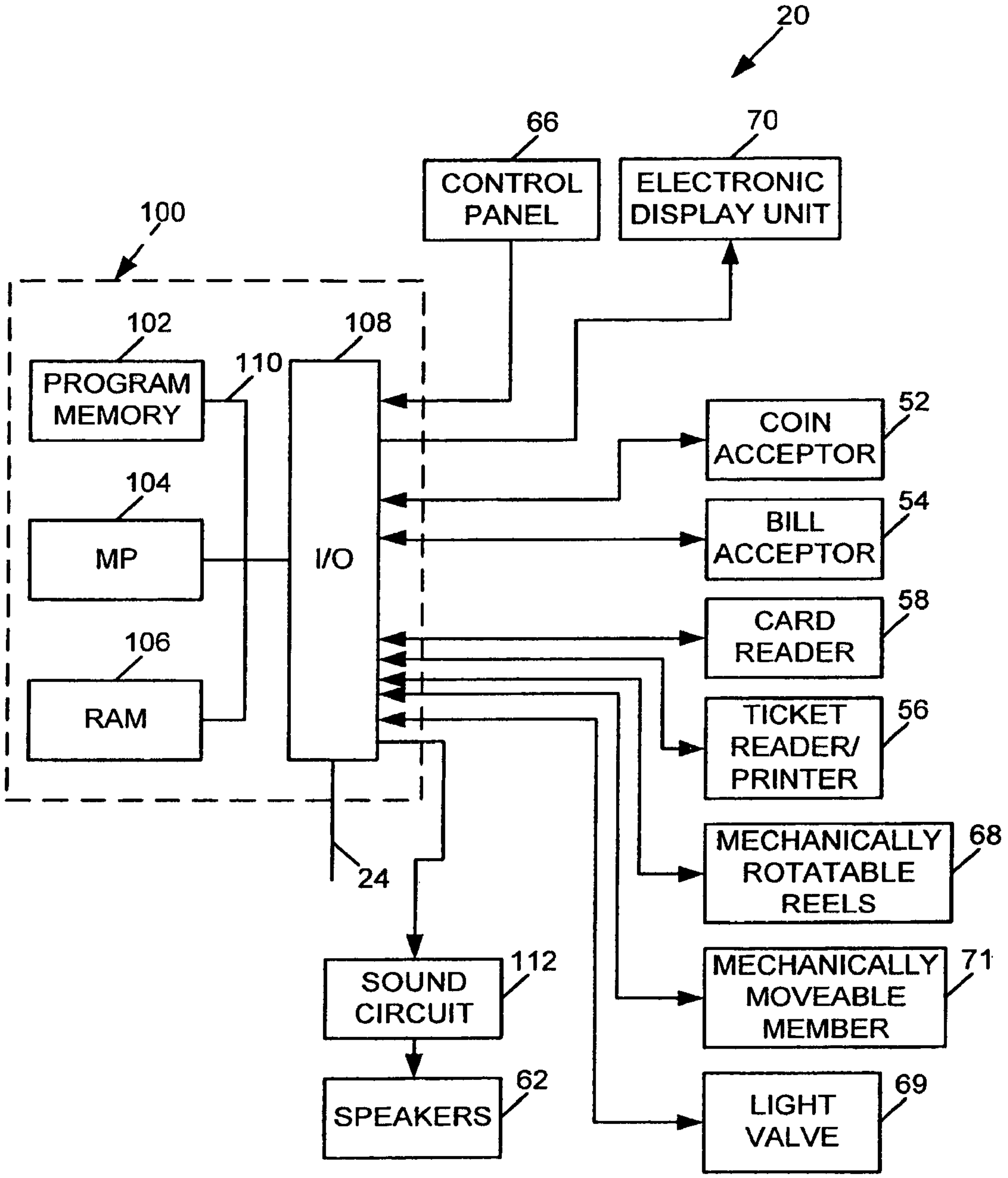
FIG. 5 is a block diagram of the electronic components of the gaming unit of FIG. 2.

FIG. 5 is a block diagram of a number of components that may be incorporated in the gaming unit 20. Referring to FIG. 5, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 5 as a read-only memory (ROM) 102, the program memory of the controller 100 may be a read/write or alterable memory, such as a hard disk. In the event a hard disk is used as a program memory, the address/data bus 110 shown schematically in FIG. 5 may comprise multiple address/data buses, which may be of different types, and there may be an I/O circuit disposed between the address/data buses.

FIG. 5 illustrates that the control panel 66, the electronic display unit 70, the coin acceptor 52, the bill acceptor 54, the card reader 58, the ticket reader/printer 56, the mechanically rotatable reels 68, the mechanically moveable member 71, and the light valve 69 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 5, the components 52, 54, 56, 58, 66, 68, 69, 70, 71, and 112 may be connected to the I/O circuit 108 via a respective direct line or conductor. Different connection schemes could be used. For example, one or more of the components shown in FIG. 5 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 6:
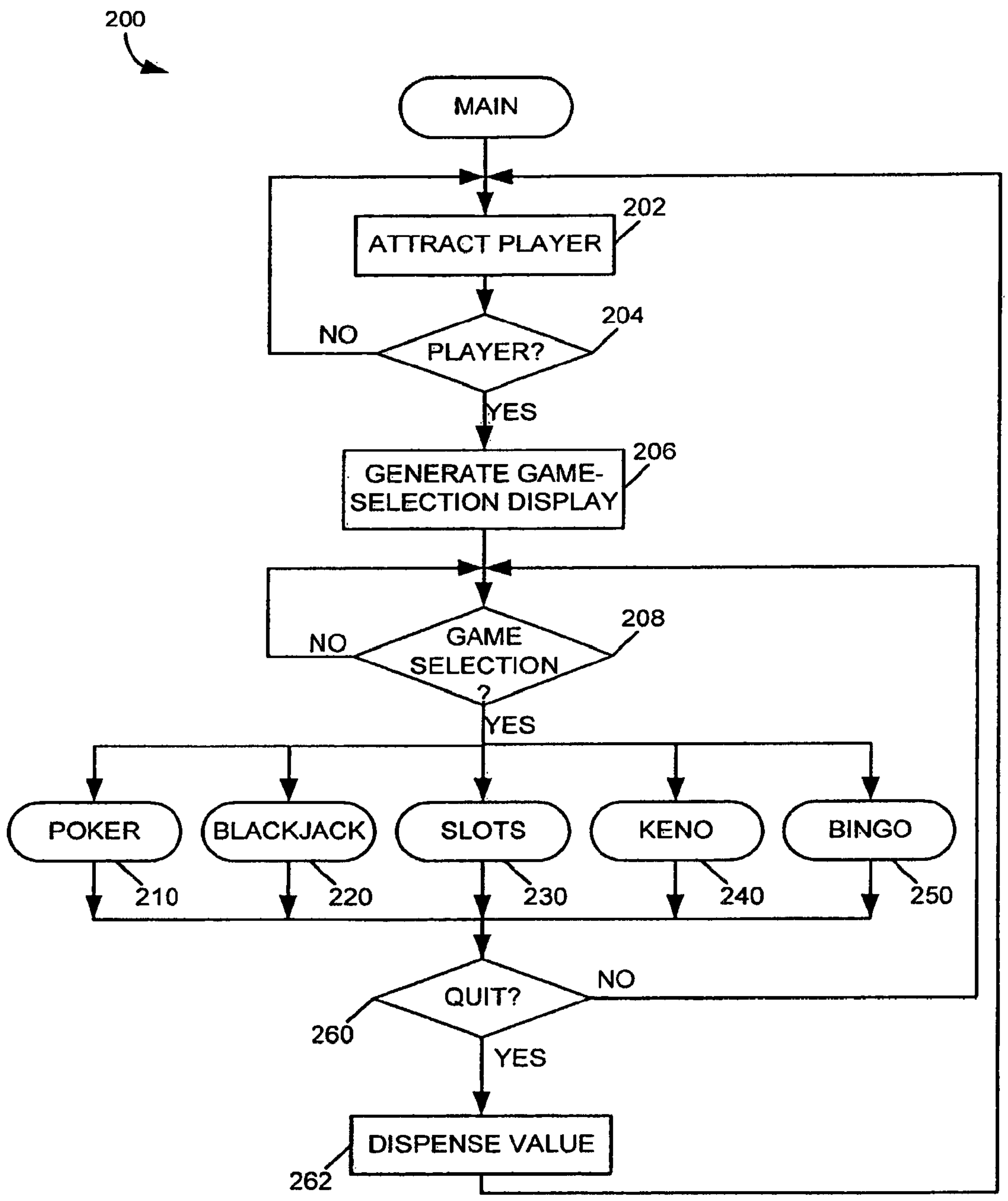
FIG. 6 is a flowchart of an embodiment of a main routine that may be performed during operation of one or more of the gaming units.

FIG. 6 is a flowchart of a main operating routine 200 that may be stored in the memory of the controller 100. Referring to FIG. 6, the main routine 200 may begin operation at block 202 during which an attraction sequence may be performed in an attempt to induce a potential player in a casino to play the gaming unit 20. The attraction sequence may be performed by displaying one or more video images on the electronic display unit 70 (if provided as a video display unit) and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the electronic display unit 70 (if provided as a video display unit) at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250.

At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 6, a different number of routines could be included to allow play of a different number of games. The gaming unit 20 may also be programmed to allow play of different games.

Figure 7:
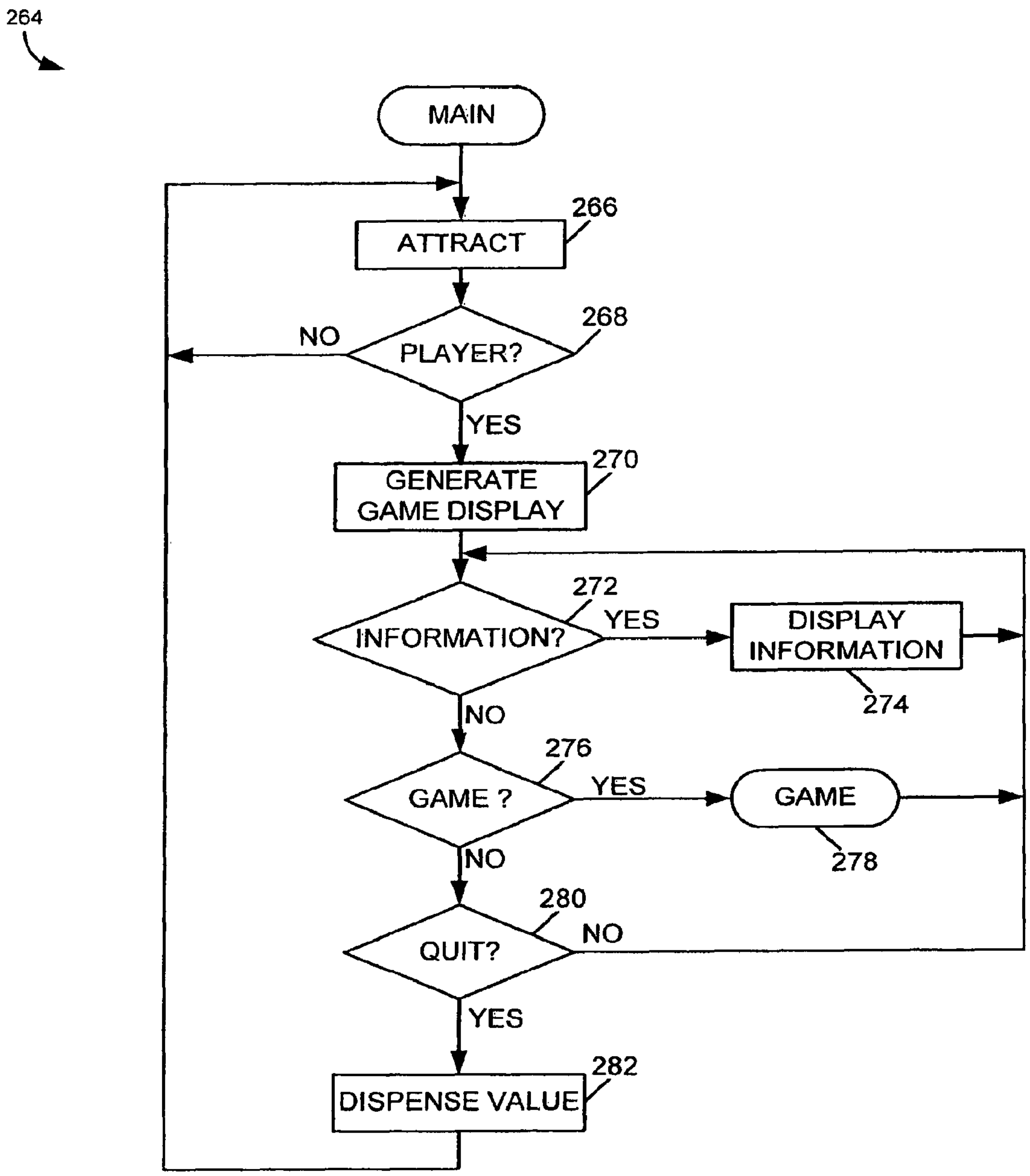
FIG. 7 is a flowchart of an alternative embodiment of a main routine that may be performed during operation of one or more of the gaming units.

FIG. 7 is a flowchart of an alternative main operating routine 264 that may be stored in the memory of the controller 100. The main routine 264 may be utilized for gaming units 20 that are designed to allow play of only a single game or single type of game. Referring to FIG. 7, the main routine 264 may begin operation at block 266 during which an attraction sequence may be performed in an attempt to induce a potential player in a casino to play the gaming unit 20. The attraction sequence may be performed by displaying one or more video images on the electronic display unit 70 (if provided as a video display unit) and/or causing one or more sound segments, such as voice or music, to be generated via the speakers 62.

During performance of the attraction sequence, if a potential player makes any input to the gaming unit 20 as determined at block 268, the attraction sequence may be terminated and a game display may be generated on the electronic display unit 70 (if provided as a video display unit) at block 270. The game display generated at block 270 may include, for example, an image of the casino game that may be played on the gaming unit 20 and/or a visual message to prompt the player to deposit value into the gaming unit 20. At block 272, the gaming unit 20 may determine if the player requested information concerning the game, in which case the requested information may be displayed at block 274. Block 276 may be used to determine if the player requested initiation of a game, in which case a game routine 278 may be performed. The game routine 278 could be any one of the game routines disclosed herein, such as one of the five game routines 210, 220, 230, 240, 250, or another game routine.

After the routine 278 has been performed to allow the player to play the game, block 280 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 282 based on the outcome of the game(s) played by the player. The operation may then return to block 266. If the player did not wish to quit as determined at block 280, the operation may return to block 272.

Light Valve Control

Figure 8:
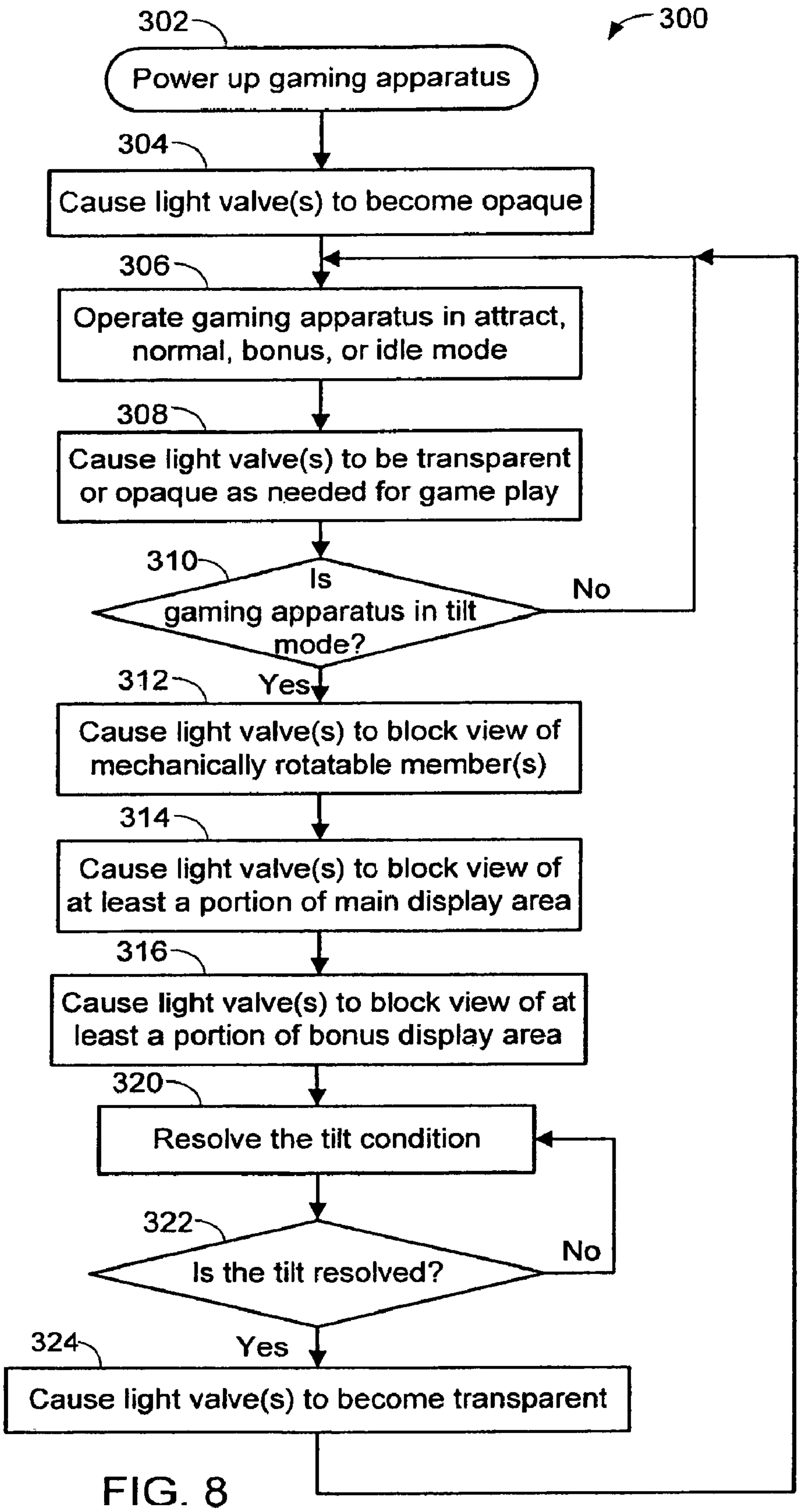
FIG. 8 is a flowchart of an embodiment of a light valve control routine that may be performed during operation of the gaming units.

FIG. 8 is flowchart of a light valve control routine 300 which may be executed by the controller 100 in conjunction with or as part of the main routines 200, 264. Referring to FIG. 8, at block 302, the routine may power up the gaming unit 20 by going through a normal power up sequence. The routine 300 may then cause the light valve 69 to become opaque at block 304 and block all viewing areas from view. This may include blocking view of the slot reels 68, the bonus viewing area, the mechanically moveable member, and any other viewing areas provided.

The routine 300 will then cause the gaming unit 20 to operate in an attract, normal, bonus, or idle mode at block 308 as well as causing the light valve 69 (whether light valve 69 is a single light valve, or multiple light valves) to be transparent or opaque as needed for the game play as shown at block 308. Depending on the particular light valve 69 being utilized, causing the light valve 69 to become transparent may involve either applying (or increasing) a voltage to the light valve 69 or discontinuing (or decreasing) the voltage being applied to the light valve 69.

The slot reels 68 may have an illumination element to enhance their visibility to a player. Other mechanically moveable members, if provided, may correspond to the game and may be activated as part of the game.

At block 310, the routine may determine if the gaming unit 20 is in a tilt mode. A tilt may occur on the gaming unit 20 at any time. For example, a coin-in tilt may occur when coins are input into the gaming unit 20. Also, a mechanical malfunction in the operation of the gaming unit 20, such as, doors opening inside the gaming unit, reels stopping in the wrong position, etc., could cause a tilt condition. An electrical malfunction in the operation of the gaming unit 20, such as, a power supply failure, a communication failure, a device failure, etc., may cause a tilt condition. Also, a customer action damaging mechanical or electrical components could cause a tilt condition. A hopper empty condition where coins need to be placed in the hopper because the hopper is empty could also cause a tilt condition.

If it is determined at the block 310 that the gaming unit 20 is not in a tilt mode, the routine 300 will return to the block 306. If a tilt mode is detected at the block 310, the routine 300 may cause the light valve 69 to become opaque and block the view of: the slot reels 68 at block 312, at least a portion of the main display area on the electronic display unit 70 at a block 314, and block at least a portion of the bonus display area on the electronic display unit 70 at a block 316.

The gaming unit 20 may then be serviced to resolve the tilt condition at a block 320. The service may require the display areas to be transparent for servicing. If it is determined at the block 322 that the tilt condition has been resolved, the routine 300 may cause the light valve 69 to become transparent at a block 324. If multiple light valves are utilized, select light valves may be changed from the opaque state to the transparent state as needed so the gaming unit 20 is put back into the state just before the tilt occurred. The routine 300 may then return to the block 306. Also, the routine 300 described herein may comprise additional or fewer criteria than indicated.

Figure 9A:
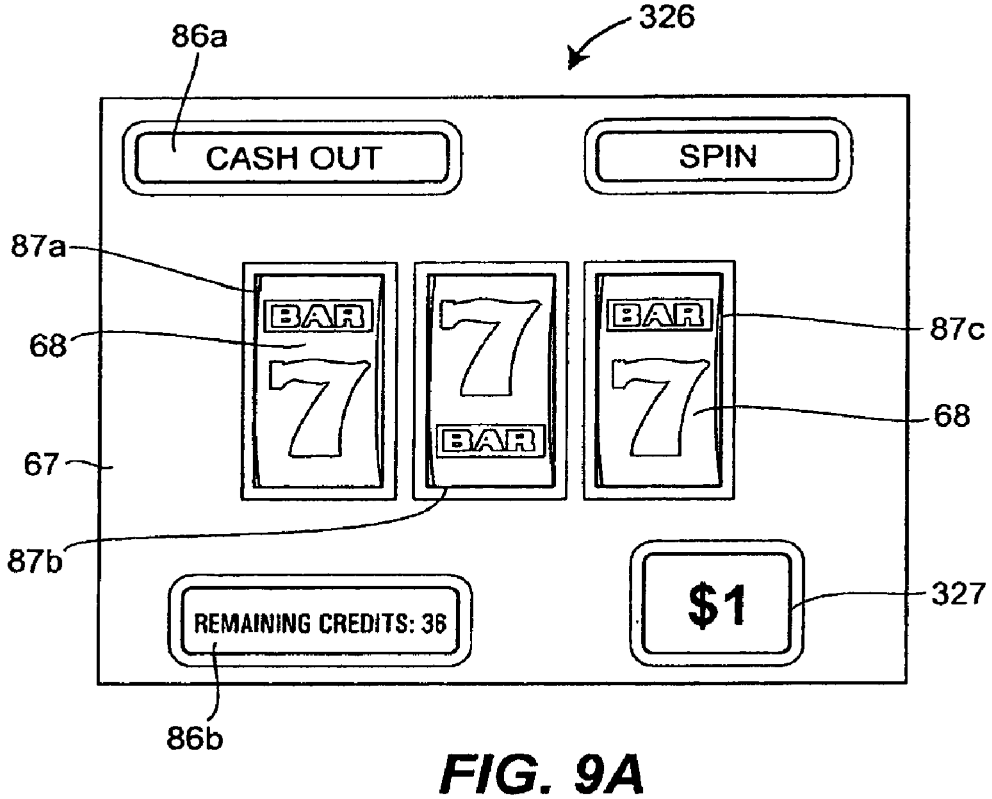
FIGS. 9A and B are illustrations of the visual results of the light valve control routine of FIG. 8.

Although examples of displays are described herein as comprising particular images on electronic display units 70, those of ordinary skill in the art will recognize that the electronic display units 70 are not limited to any particular image. FIG. 9A is an exemplary display 326 that may be viewed by a player during performance of a slots routine utilizing a plurality mechanical slot reels 68. Referring to FIG. 9A, the controller 100 has caused the light valve 69 to become transparent to allow the mechanical devices and electrical images disposed behind the light valve 69 to be visible. As seen in FIG. 9A, a player is able to view portions of the mechanical slot reels 68 through the openings 87*a*, 87*b*, 87*c* in the transparent panel 67.

Additional graphics may also be displayed by the electronic display unit 70 and viewed through the various openings in the transparent panel 67. For example, the name of the game routine being played may be viewed through one of the openings, the current bet ($1) may be viewed through an opening 327, the number of remaining credits may be viewed in the opening 86*b*, and the minimum bet may be displayed in another opening. Additional graphics relating to the game routine may be displayed on one or more of the electronic display units 70. For example, the electronic display units 70 may include video images of a plurality of player selectable buttons to allow the player to control the play of the slots game. The buttons may include a “See Pays” button, a “Cash Out” button, a “Spin” button, and a “Max Bet” button. Player information may also be generated as a video image on the electronic display units 70. The player information video image may include the player’s name, the player’s winnings, the player’s profile, the player’s wagers, the player’s favorite games, etc.

Figure 9B:
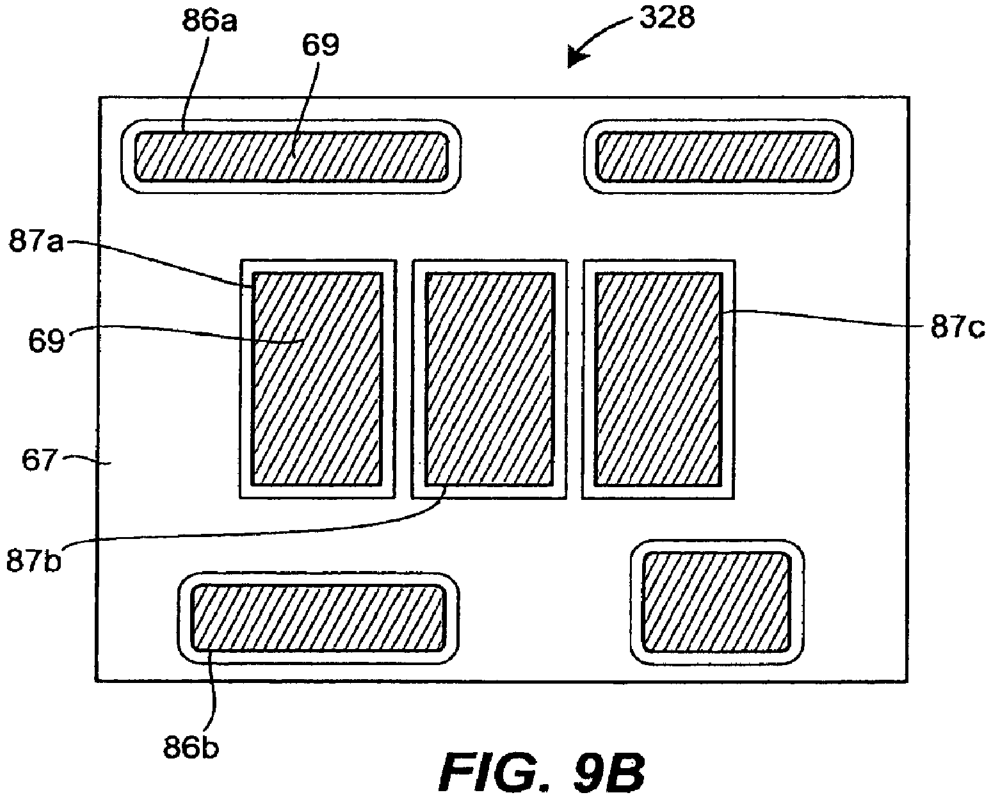

FIG. 9B is an exemplary display 328 that may be viewed by a player when the controller 100 caused the light valve 69 to become substantially opaque to block the view of the mechanical slot reels 68 and the video images on the electronic display units 70. As seen in FIG. 9B, a player viewing the electronic gaming unit 20 is unable to see the mechanical slot reels 68 or the video images on the electronic display units 70 through the various openings, such as openings 86*a*, 86*b*, 87*a*, 87*b*, and 87*c* in the transparent panel 67. The display 328 as shown in FIG. 9B may relate to a display shown during an attraction sequence. Attraction graphics may be generated on the electronic display units 70, which may include a video image of a scrolling list of games that may be played on the gaming unit 20, and a video image of instructions for initiating a new game.

Figure 10:
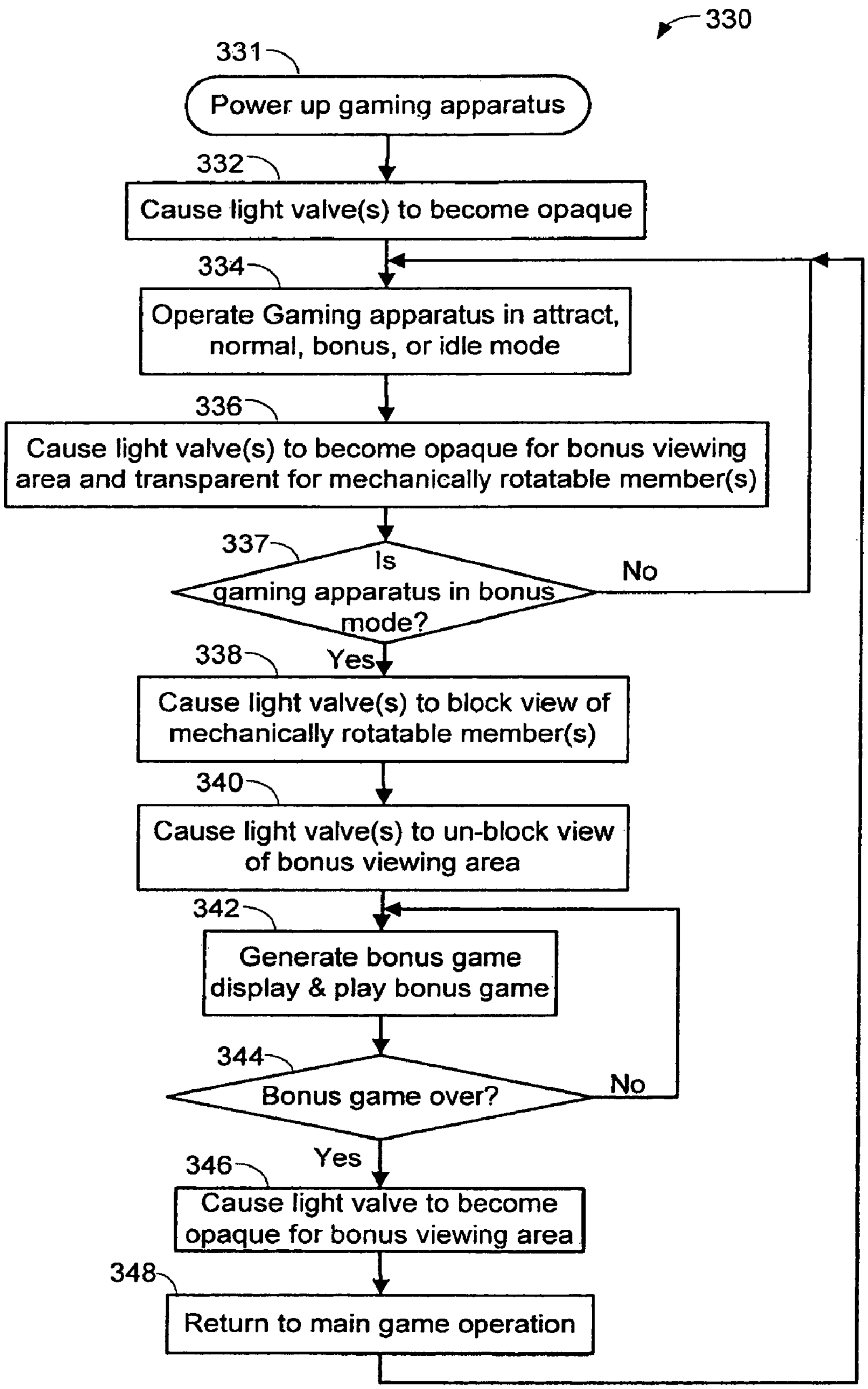
FIG. 10 is a flowchart of an alternative embodiment of a light valve control routine that may be performed during operation of the gaming units.

FIG. 10 is a flowchart 330 of an alternative embodiment of a light valve control routine that may be performed during operation of the gaming unit 20. Referring to FIG. 10, at block 331, the routine may power up the gaming unit 20 by going through a normal power up sequence. The routine 330 may then cause the light valve 69 to become opaque at block 332 and block all viewing areas from view. This may include blocking view of the slot reels 68, the bonus viewing area, the mechanically moveable member, and any other viewing areas provided.

The routine 330 may then cause the gaming unit 20 to operate in an attract, normal, bonus, or idle mode at block 334 as well as causing the light valve 69 (whether light valve 69 is a single light valve, or multiple light valves) to be opaque for the bonus viewing area on the electronic display unit 70 and transparent for the slot reels 68, as shown at block 336. Depending on the particular light valve 69 being utilized, causing the light valve 69 to become transparent may involve either applying (or increasing) a voltage to the light valve 69 or discontinuing (or decreasing) the voltage being applied to the light valve 69.

The slot reels 68 may have an illumination element to enhance their visibility to a player. Other mechanically moveable members, if provided, may correspond to the game and may be activated as part of the game.

At block 337, the routine may determine if the gaming unit 20 is in a bonus mode. A bonus mode may be entered when the player wins a select outcome on the slots game. If it is determined at the block 337 that the gaming unit 20 is not in a bonus mode, the routine 330 may return to the block 334. If a bonus mode is detected at the block 337, the routine 330 may cause the light valve 69 to become opaque and block the view of the slot reels 68 at a block 338 and to cause one of a plurality of light valves 69 in front of the electronic display unit 70 to become transparent to un-block the view of the bonus viewing area at a block 340.

The routine 330 may then generate a bonus game display and allow a player to play the bonus game at a block 342. When it is determined at a block 344 that the bonus game is completed, the routine 330 may cause the light valve 69 to become opaque for the bonus viewing area. At a block 348, the routine 330 may return to the main game operation at the block 334.

Figure 11:
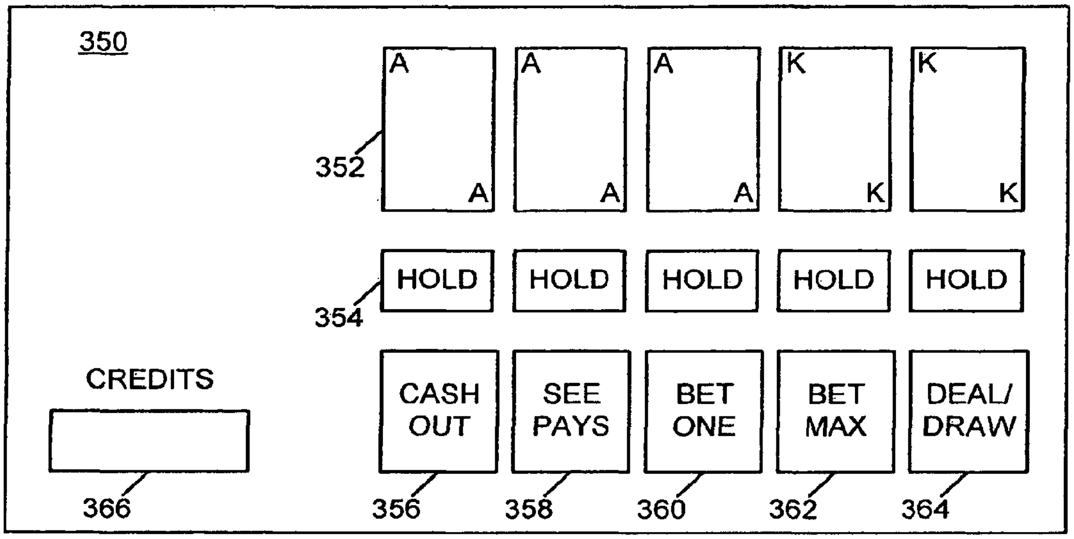
FIG. 11 is an illustration of an embodiment of a visual display that may be displayed during performance of the video poker routine of FIG. 13.

Video Poker

Where the gaming unit 20 is designed to facilitate play of a video poker game, the electronic display unit 70 may comprise a video display unit. FIG. 11 is an exemplary display 350 that may be shown on the electronic display unit 70 during performance of the video poker routine 210 shown schematically in FIG. 6. Referring to FIG. 11, the display 350 may include video images 352 of a plurality of playing cards representing the player’s hand, such as five cards. To allow the player to control the play of the video poker game, a plurality of player-selectable buttons may be displayed. The buttons may include a “Hold” button 354 disposed directly below each of the playing card images 352, a “Cash Out” button 356, a “See Pays” button 358, a “Bet One Credit” button 360, a “Bet Max Credits” button 362, and a “Deal/Draw” button 364. The display 350 may also include an area 366 in which the number of remaining credits or value is displayed. If the electronic display unit 70 is provided with a touch-sensitive screen, the buttons 354, 356, 358, 360, 362, 364 may form part of the video display 350. Alternatively, one or more of those buttons may be provided as part of a control panel that is provided separately from the electronic display unit 70.

Figure 13:
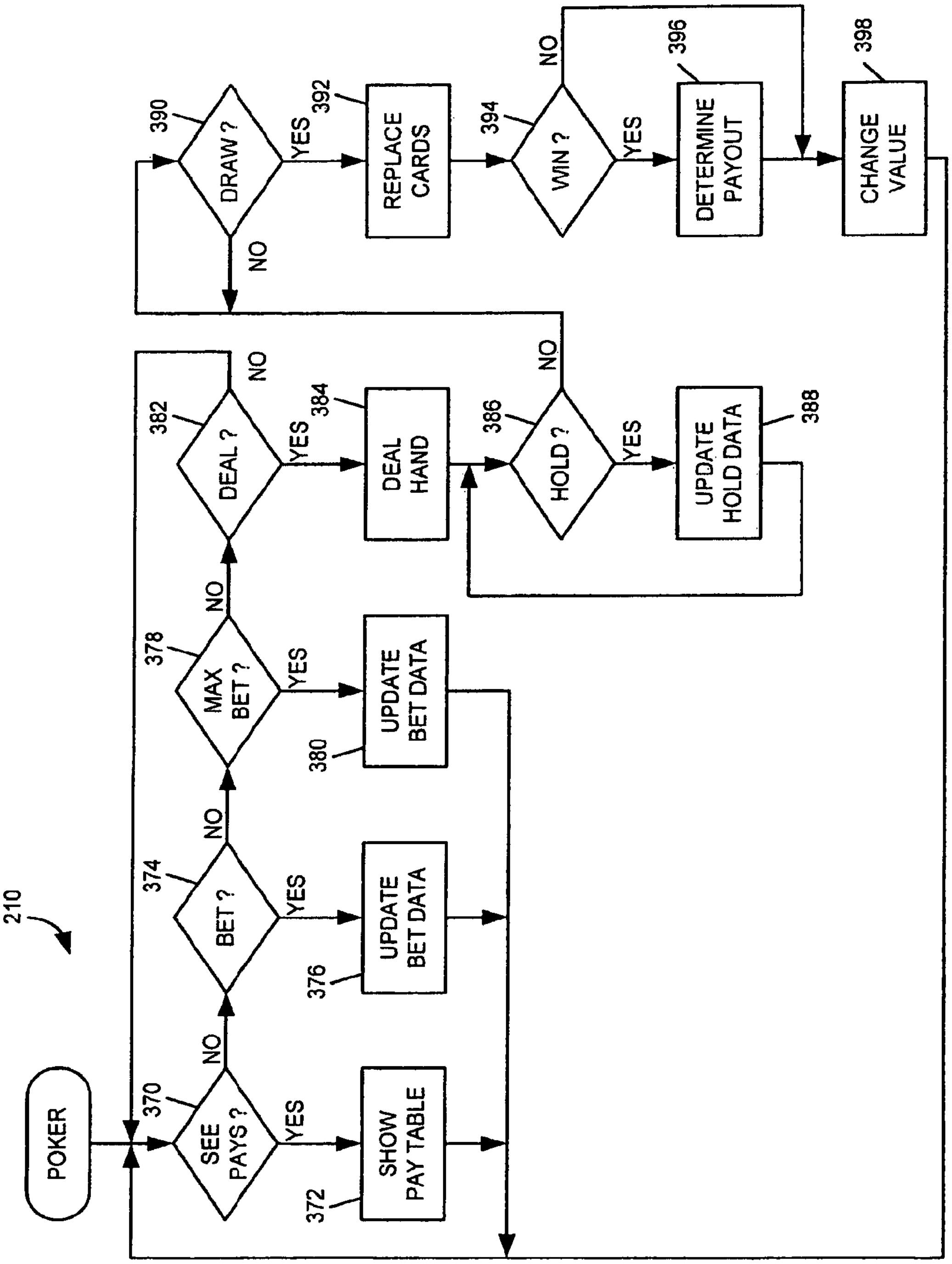
FIG. 13 is a flowchart of an embodiment of a video poker routine that may be performed by one or more of the gaming units.

FIG. 13 is a flowchart of the video poker routine 210 shown schematically in FIG. 6. Referring to FIG. 13, at block 370, the routine may determine whether the player has requested payout information, such as by activating the “See Pays” button 358, in which case at block 372 the routine may cause one or more pay tables to be displayed on the electronic display unit 70. At block 374, the routine may determine whether the player has made a bet, such as by pressing the “Bet One Credit” button 360, in which case at block 376 bet data corresponding to the bet made by the player may be stored in the memory of the controller 100. At block 378, the routine may determine whether the player has pressed the “Bet Max Credits” button 362, in which case at block 380 bet data corresponding to the maximum allowable bet may be stored in the memory of the controller 100.

At block 382, the routine may determine if the player desires a new hand to be dealt, which may be determined by detecting if the “Deal/Draw” button 364 was activated after a wager was made. In that case, at block 384 a video poker hand may be “dealt” by causing the electronic display unit 70 to generate the playing card images 352. After the hand is dealt, at block 386 the routine may determine if any of the “Hold” buttons 354 have been activated by the player, in which case data regarding which of the playing card images 352 are to be “held” may be stored in the controller 100 at block 388. If the “Deal/Draw” button 364 is activated again as determined at block 390, each of the playing card images 352 that was not “held” may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 11).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Figure 12:
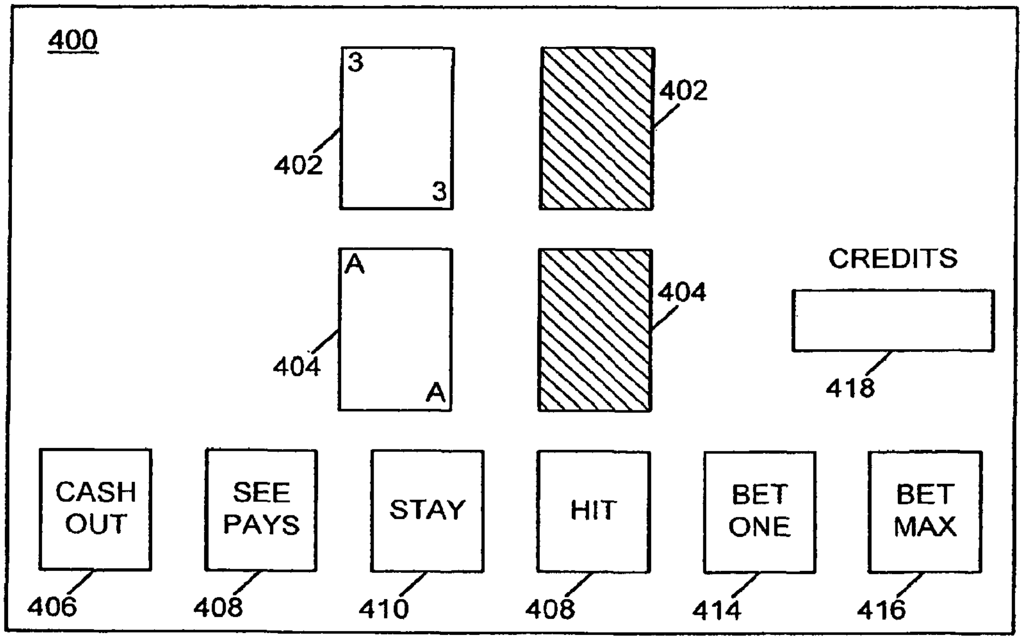
FIG. 12 is an illustration of an embodiment of a visual display that may be displayed during performance of the video blackjack routine of FIG. 14.

Video Blackjack

Where the gaming unit 20 is designed to facilitate play of a video blackjack game, the electronic display unit 70 may comprise a video display unit. FIG. 12 is an exemplary display 400 that may be shown on the electronic display unit 70 during performance of the video blackjack routine 220 shown schematically in FIG. 6. Referring to FIG. 12, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the electronic display unit 70 is provided with a touch-sensitive screen, the buttons 406, 408, 410, 412, 414, 416 may form part of the video display 400. Alternatively, one or more of those buttons may be provided as part of a control panel that is provided separately from the electronic display unit 70.

Figure 14:
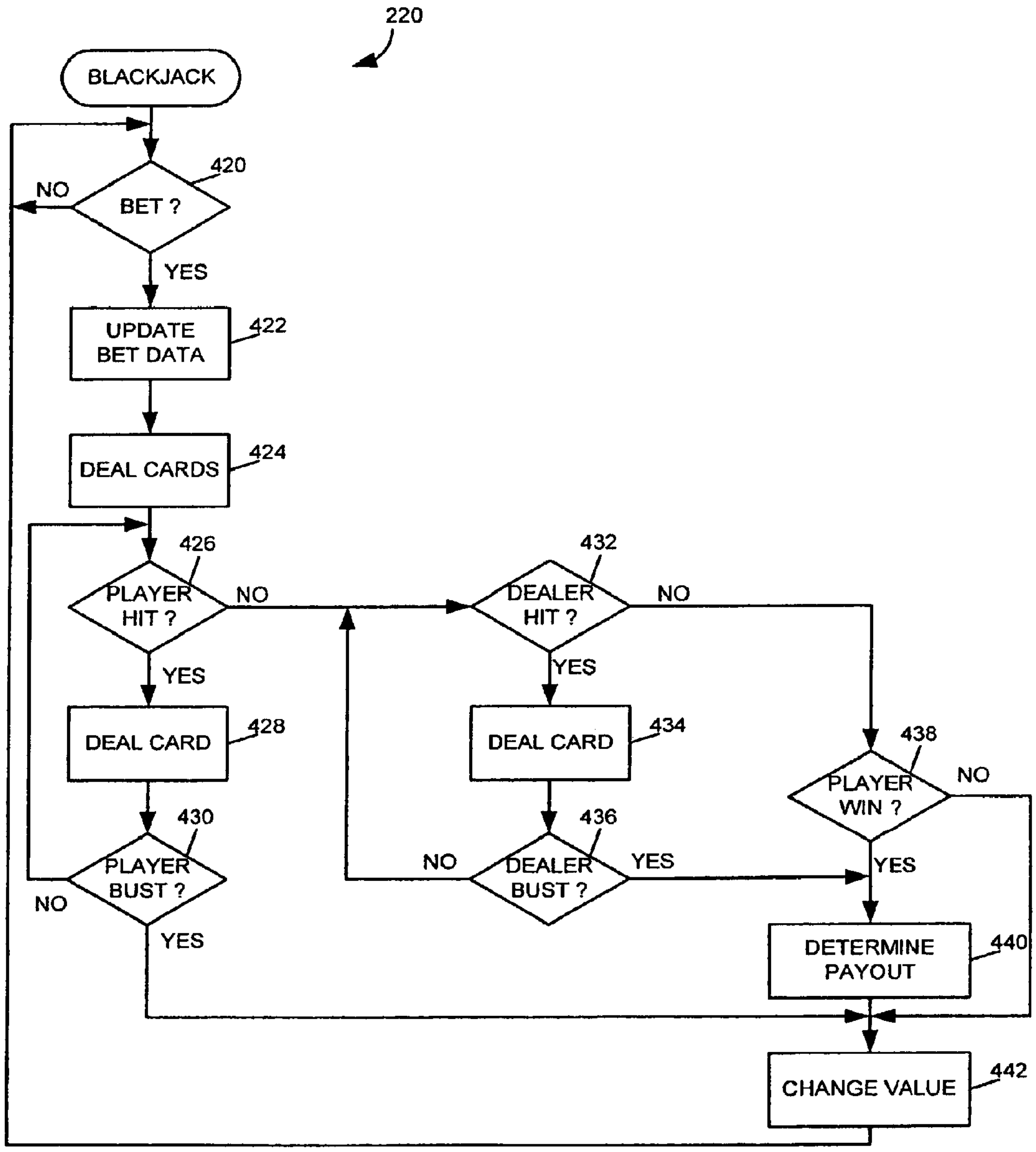
FIG. 14 is a flowchart of an embodiment of a video blackjack routine that may be performed by one or more of the gaming units.

FIG. 14 is a flowchart of the video blackjack routine 220 shown schematically in FIG. 6. Referring to FIG. 14, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the electronic display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 12).

Figure 15:
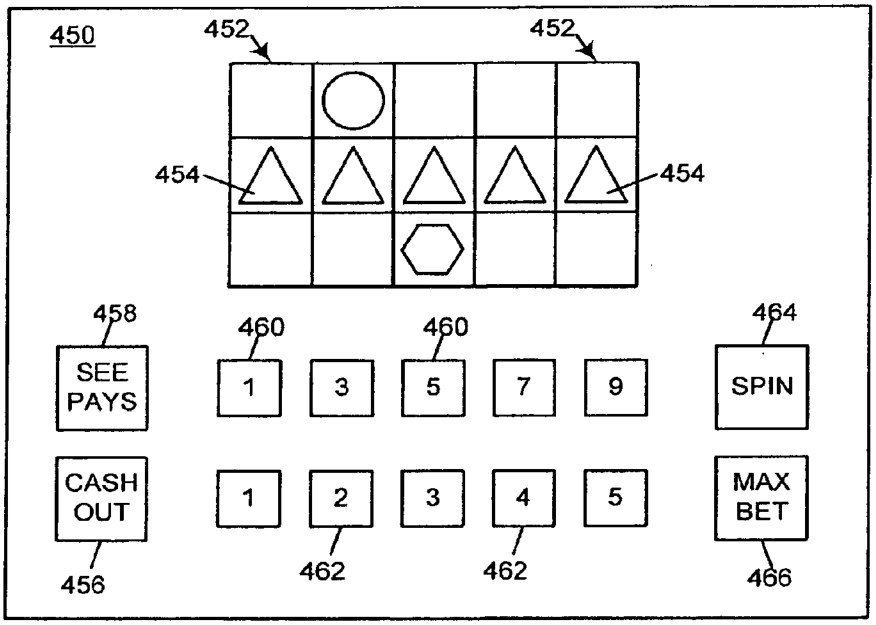
FIG. 15 is an illustration of an embodiment of a visual display that may be displayed during performance of the slots routine of FIG. 17.

Slots

Where the gaming unit 20 is designed to facilitate play of a video slots game, the electronic display unit 70 may comprise a video display unit. FIG. 15 is an exemplary display 450 that may be shown on the electronic display unit 70 during performance of the slots routine 230 shown schematically in FIG. 6. Referring to FIG. 15, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 17:
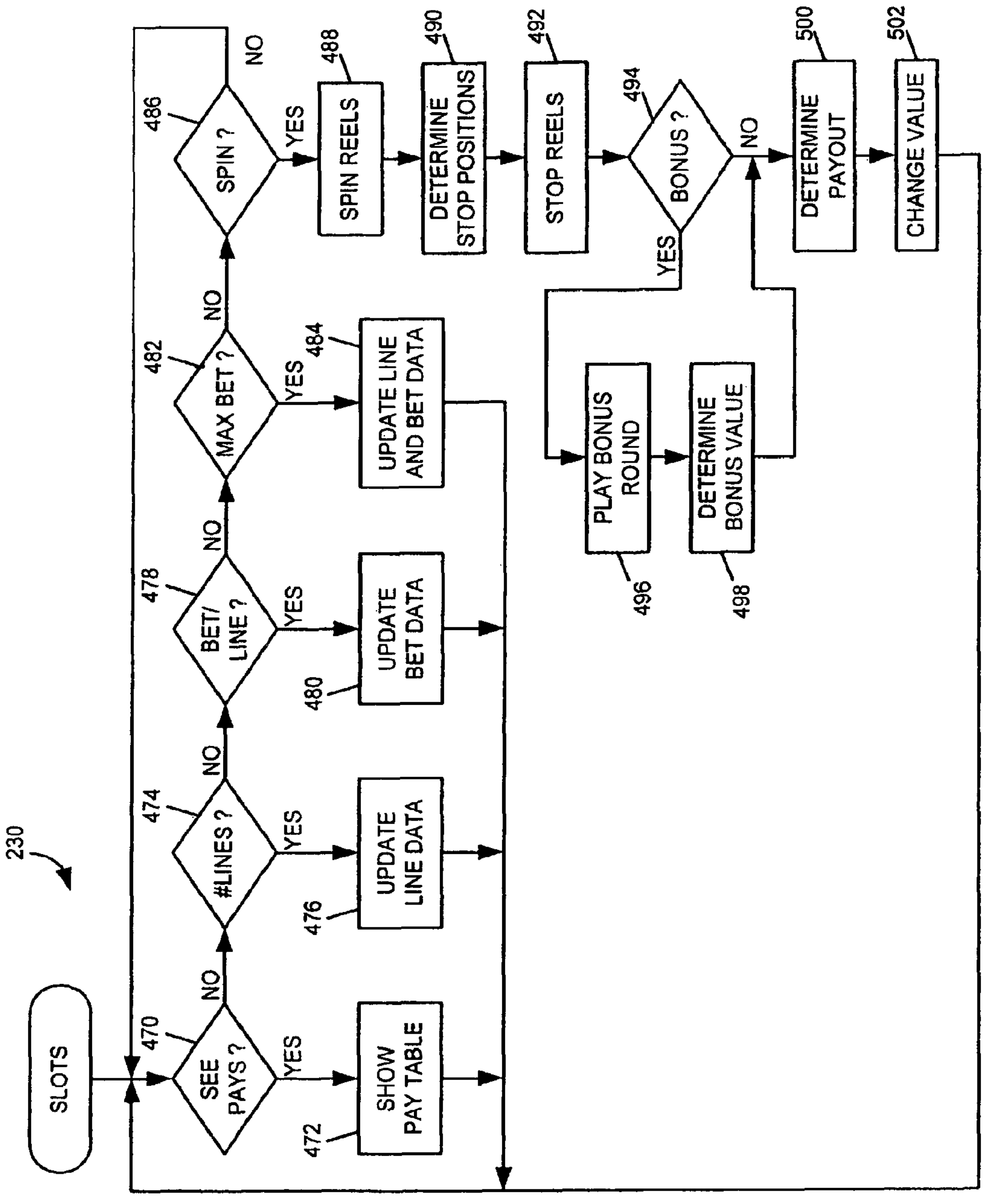
FIG. 17 is a flowchart of an embodiment of a slots routine that may be performed by one or more of the gaming units.

FIG. 17 is a flowchart of the slots routine 230 shown schematically in FIG. 6. Referring to FIG. 17, at block 470, the routine may determine whether the player has requested payout information, such as by activating the "See Pays" button 458, in which case at block 472 the routine may cause one or more pay tables to be displayed on the electronic display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the electronic display unit 70, actual slot machine reels that are capable of being spun may be utilized instead, in which case the electronic display unit 70 could be provided in the form of a plurality of mechanical reels that are rotatable, each of the reels having a plurality of reel images disposed thereon.

Figure 16:
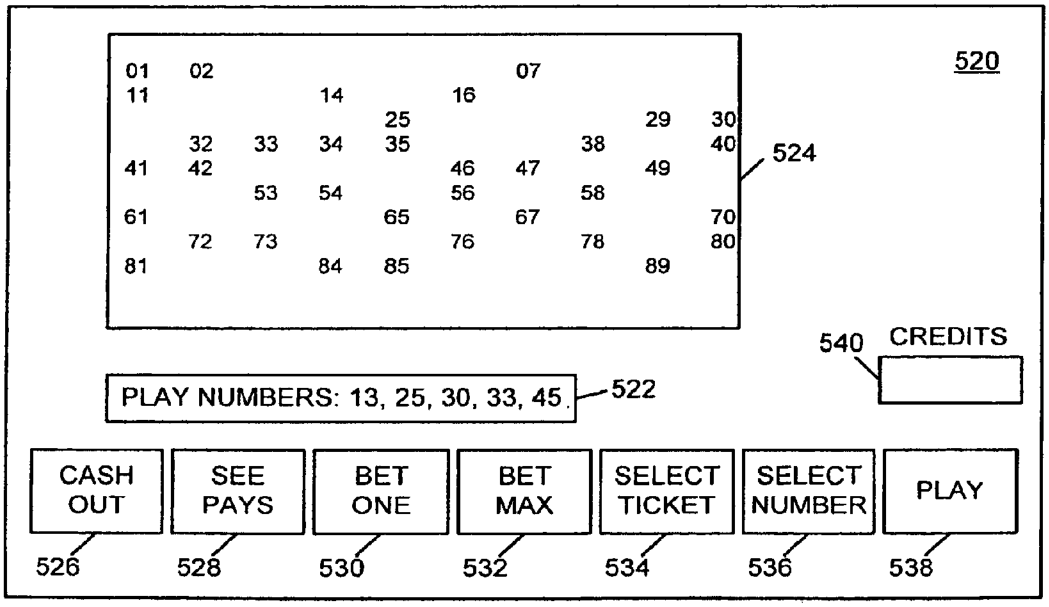
FIG. 16 is an illustration of an embodiment of a visual display that may be displayed during performance of the video keno routine of FIG. 18.

Video Keno

Where the gaming unit 20 is designed to facilitate play of a video keno game, the electronic display unit 70 may comprise a video display unit. FIG. 16 is an exemplary display 520 that may be shown on the electronic display unit 70 during performance of the video keno routine 240 shown schematically in FIG. 6. Referring to FIG. 16, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the electronic display unit 70 is provided with a touch-sensitive screen, the buttons may form part of the video display 520. Alternatively, one or more of those buttons may be provided as part of a control panel that is provided separately from the electronic display unit 70.

Figure 18:
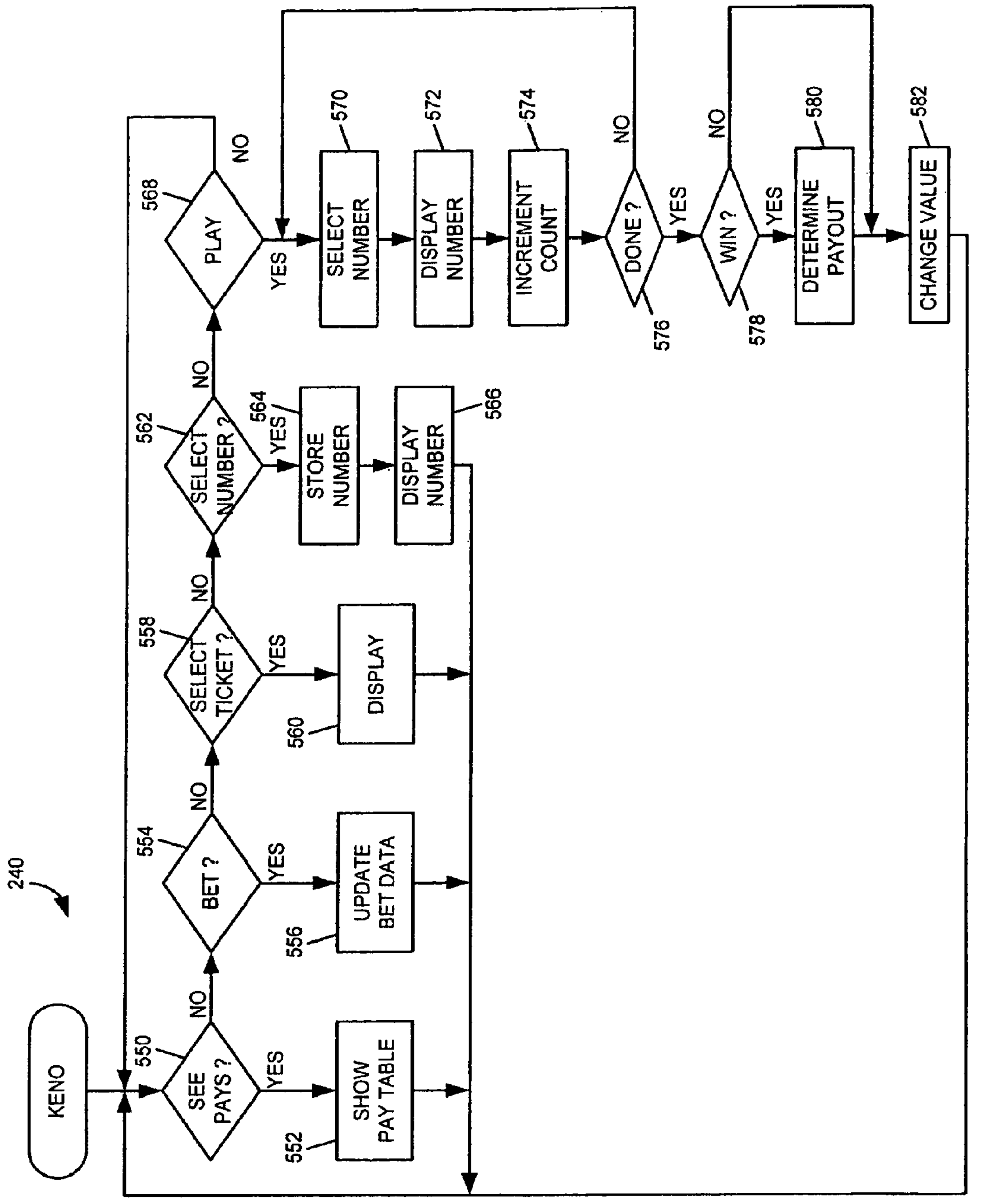
FIG. 18 is a flowchart of an embodiment of a video keno routine that may be performed by one or more of the gaming units.

FIG. 18 is a flowchart of the video keno routine 240 shown schematically in FIG. 6. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 18, at block 550, the routine may determine whether the player has requested payout information, such as by activating the "See Pays" button 528, in which case at block 552 the routine may cause one or more pay tables to be displayed on the electronic display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the electronic display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 16).

Figure 19:
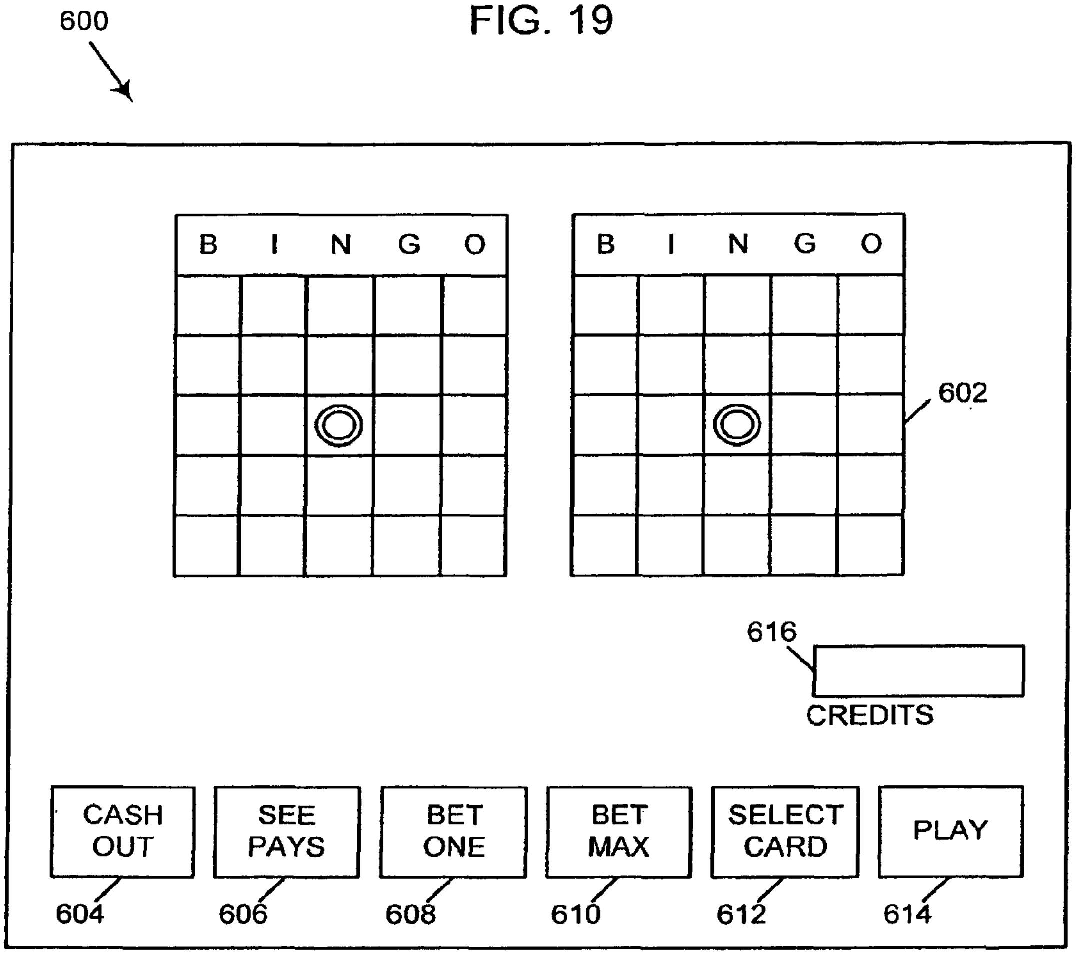
FIG. 19 is an illustration of an embodiment of a visual display that may be displayed during performance of the video bingo routine of FIG. 20.

Video Bingo

Where the gaming unit 20 is designed to facilitate play of a video bingo game, the electronic display unit 70 may comprise a video display unit. FIG. 19 is an exemplary display 600 that may be shown on the electronic display unit 70 during performance of the video bingo routine 250 shown schematically in FIG. 6. Referring to FIG. 19, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the electronic display unit 70 is provided with a touch-sensitive screen, the buttons may form part of the video display 600. Alternatively, one or more of those buttons may be provided as part of a control panel that is provided separately from the electronic display unit 70.

Figure 20:
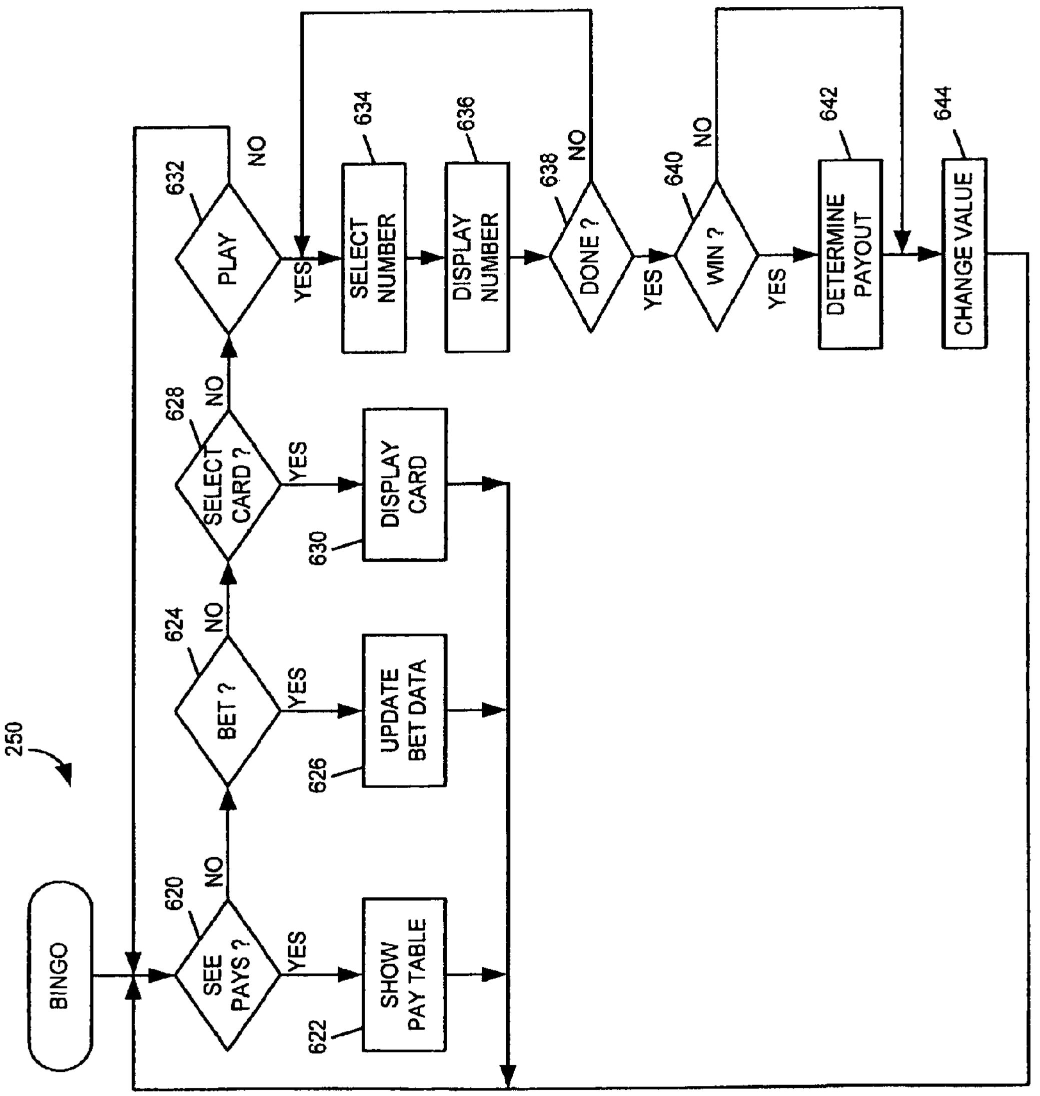
FIG. 20 is a flowchart of an embodiment of a video bingo routine that may be performed by one or more of the gaming units.

FIG. 20 is a flowchart of the video bingo routine 250 shown schematically in FIG. 6. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 20, at block 620, the routine may determine whether the player has requested payout information, such as by activating the "See Pays" button 606, in which case at block 622 the routine may cause one or more pay tables to be displayed on the electronic display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the electronic display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 19).

What is claimed is:

1. A gaming machine comprising:

a housing;

a transparent panel associated with the housing that comprises an outer surface and an inner surface;

a first transparent electronic display unit for displaying images and disposed inside of the transparent panel relative to the housing;

a second electronic display unit for displaying images and disposed inside the first transparent electronic display unit relative to the housing;

a light valve disposed between the inner surface of the transparent panel and the first transparent electronic display unit, coupled to a power source, adapted to become substantially transparent with a first voltage, and adapted to become substantially opaque with a second voltage, wherein the light valve is configured to block visibility of the first transparent electronic display unit and second electronic display unit to a person proximate to the outer surface of the transparent panel when the light valve receives the second voltage; and a controller comprising a processor and a memory operatively coupled to the processor, the controller configured to cause said second voltage to be applied to said light valve when said gaming machine is in a tilt condition and when the power source is active and the controller further configured to cause said first voltage to be applied to said light valve when said gaming machine is to be serviced in order to resolve the tilt condition.

2. The gaming machine of claim 1 further comprising a relay device operatively coupled to the light valve and the controller and configured to provide the second voltage to the light valve when the gaming machine is in the tilt condition.

3. The gaming machine of claim 1 wherein the tilt condition includes a mechanical malfunction in the operation of the gaming apparatus.

4. The gaming machine of claim 1 wherein the tilt condition includes an electrical malfunction in the operation of the gaming apparatus.

5. The gaming machine of claim 1 wherein the second voltage is substantially zero volts.

6. The gaming machine of claim 1 wherein the light valve includes a suspended particle device.

7. The gaming machine of claim 1 wherein the light valve is operatively coupled to the controller.

8. A gaming method, comprising:

allowing a person to make a wager on a gaming apparatus for a game associated with a first transparent electronic display unit disposed within the gaming apparatus and associated with a second electronic display unit disposed within the gaming apparatus;

displaying the game on the first transparent electronic display unit and the second electronic display unit;

sending a first signal to cause a light valve, disposed between the first transparent electronic display unit and a transparent display panel disposed closer to the person than the first transparent electronic display unit, to become substantially transparent with a first voltage so that the first transparent electronic display unit and the second electronic display unit are visible to the person through the light valve;

providing a value payout associated with an outcome of the game associated with the first transparent electronic display unit and the second electronic display unit;

sending a second signal to cause the light valve to become substantially opaque with a second voltage so that visibility of the first transparent electronic display unit and the second electronic display unit is substantially blocked by the light valve when the gaming apparatus is in a tilt condition; and sending the first signal to cause the light valve to become substantially transparent with the first voltage when the gaming apparatus is to be serviced in order to resolve the tilt condition.

9. The gaming method of claim 8 wherein the tilt condition includes a mechanical malfunction in the operation of the gaming apparatus.

10. The gaming method of claim 8 wherein the tilt condition includes an electrical malfunction in the operation of the gaming apparatus.

11. The gaming method of claim 8 wherein the second voltage is substantially zero volts.

12. The gaming method of claim 8 wherein the light valve includes a suspended particle device.

13. The gaming method of claim 8 further comprising providing, via a relay device operatively coupled to the light valve and a controller, the second voltage applied to the light valve when the gaming machine is in the tilt condition.

* * * * *